(12) United States Patent
Oehring et al.

(10) Patent No.: US 12,152,711 B2
(45) Date of Patent: Nov. 26, 2024

(54) SYSTEM AND METHOD FOR INTEGRATED FLOW SUPPLY LINE

(71) Applicant: U.S. Well Services, LLC, Houston, TX (US)

(72) Inventors: Jared Oehring, Houston, TX (US); Brandon Hinderliter, Houston, TX (US); Lon Robinson, Houston, TX (US); Alexander James Christinzio, Houston, TX (US)

(73) Assignee: U.S. Well Services, LLC, Houston, TX (US)

( * ) Notice: Subject to any disclaimer, the term of this patent is extended or adjusted under 35 U.S.C. 154(b) by 0 days.

(21) Appl. No.: 18/206,313

(22) Filed: Jun. 6, 2023

(65) Prior Publication Data
US 2024/0019057 A1 Jan. 18, 2024

Related U.S. Application Data

(63) Continuation of application No. 17/321,936, filed on May 17, 2021, now Pat. No. 11,668,420, which is a
(Continued)

(51) Int. Cl.
*F16L 33/02* (2006.01)
*E21B 43/26* (2006.01)
(Continued)

(52) U.S. Cl.
CPC .............. *F16L 33/02* (2013.01); *E21B 43/26* (2013.01); *F04B 1/00* (2013.01); *F04B 15/02* (2013.01); *F04B 17/03* (2013.01)

(58) Field of Classification Search
CPC .. E21B 43/26; F16L 33/02; F04B 1/00; F04B 15/02; F04B 17/03
See application file for complete search history.

(56) References Cited

U.S. PATENT DOCUMENTS

| 1,541,601 A | 6/1925 | Tribe |
| 1,656,861 A | 1/1928 | Leonard |

(Continued)

FOREIGN PATENT DOCUMENTS

| AU | 734988 B2 | 9/1997 |
| CA | 2406801 A1 | 11/2001 |

(Continued)

OTHER PUBLICATIONS

Albone, "Mobile Compressor Stations for Natural Gas Transmission Service," ASME 67-GT-33, Turbo Expo, Power for Land, Sea and Air, vol. 79887, p. 1-10, 1967.
(Continued)

*Primary Examiner* — Aaron L Lembo
(74) *Attorney, Agent, or Firm* — Hogan Lovells US LLP

(57) ABSTRACT

A hydraulic fracturing system for fracturing a subterranean formation includes an electric powered pump having an inlet and an outlet, the outlet coupled to a well associated with the subterranean formation and powered by at least one electric motor. The system also includes a fluid source, coupled to the inlet of the electric powered pump, the fluid source providing a slurry for injection into the subterranean formation. The system further includes a hose extending between the fluid source and the electric powered pump, the hose being flexible and having a first diameter. The system includes a fitting between the hose and the electric powered pump, the fitting having a first end for receiving the hose at the first diameter and a second end for coupling to the electric powered pump at a second diameter, the second diameter being larger than the first diameter.

19 Claims, 4 Drawing Sheets

Related U.S. Application Data continuation of application No. 16/728,359, filed on Dec. 27, 2019, now Pat. No. 11,009,162.

(51) Int. Cl.
*F04B 1/00* (2020.01)
*F04B 15/02* (2006.01)
*F04B 17/03* (2006.01)

(56) References Cited

U.S. PATENT DOCUMENTS

| | | |
|---|---|---|
| 1,671,436 A | 5/1928 | Melott |
| 1,743,771 A | 1/1930 | Hall et al. |
| 1,967,466 A | 7/1934 | Damsel |
| 2,004,077 A | 6/1935 | McCartney et al. |
| 2,183,364 A | 12/1939 | Bailey |
| 2,220,622 A | 11/1940 | Homer |
| 2,237,812 A | 4/1941 | De Blieux et al. |
| 2,248,051 A | 7/1941 | Armstrong |
| 2,407,796 A | 9/1946 | Page |
| 2,416,848 A | 3/1947 | Stewart |
| 2,610,741 A | 9/1952 | Schmid |
| 2,753,940 A | 7/1956 | Bonner |
| 2,852,600 A | 9/1958 | Jenkins, Jr. |
| 2,976,025 A | 3/1961 | Pro |
| 3,055,682 A | 9/1962 | Bacher et al. |
| 3,061,039 A | 10/1962 | Peters |
| 3,066,503 A | 12/1962 | Fleming et al. |
| 3,116,086 A | 12/1963 | Barengoltz |
| 3,302,069 A | 1/1967 | Webster |
| 3,334,495 A | 8/1967 | Jensen et al. |
| 3,347,570 A | 10/1967 | Roessler |
| 3,722,595 A | 3/1973 | Kiel |
| 3,764,233 A | 10/1973 | Strickland |
| 3,773,140 A | 11/1973 | Mahajan et al. |
| 3,794,846 A | 2/1974 | Schlicher et al. |
| 3,837,179 A | 9/1974 | Barth |
| 3,849,662 A | 11/1974 | Blaskowski et al. |
| 3,878,884 A | 4/1975 | Raleigh |
| 3,881,551 A | 5/1975 | Terry et al. |
| 3,967,841 A | 7/1976 | Kendrick et al. |
| 4,037,431 A | 7/1977 | Sugimoto |
| 4,100,822 A | 7/1978 | Rosman |
| 4,151,575 A | 4/1979 | Hogue |
| 4,226,299 A | 10/1980 | Hansen |
| 4,265,266 A | 5/1981 | Kierbow et al. |
| 4,411,313 A | 10/1983 | Johnson et al. |
| 4,432,064 A | 2/1984 | Barker et al. |
| 4,442,665 A | 4/1984 | Fick et al. |
| 4,456,092 A | 6/1984 | Kubozuka et al. |
| 4,506,982 A | 3/1985 | Smithers et al. |
| 4,512,387 A | 4/1985 | Rodriguez et al. |
| 4,529,887 A | 7/1985 | Johnson |
| 4,538,916 A | 9/1985 | Zimmerman |
| 4,562,360 A | 12/1985 | Fujimoto |
| 4,601,629 A | 7/1986 | Zimmerman |
| 4,603,887 A | 8/1986 | Mayfield et al. |
| 4,676,063 A | 6/1987 | Goebel et al. |
| 4,759,674 A | 7/1988 | Schroder et al. |
| 4,768,884 A | 9/1988 | Elkin |
| 4,783,038 A | 11/1988 | Gilbert et al. |
| 4,793,386 A | 12/1988 | Sloan |
| 4,845,981 A | 7/1989 | Pearson |
| 4,898,473 A | 2/1990 | Stegemoeller et al. |
| 4,922,463 A | 5/1990 | Del Zotto et al. |
| 5,004,400 A | 4/1991 | Handke |
| 5,006,044 A | 4/1991 | Walker, Sr. et al. |
| 5,025,861 A | 6/1991 | Huber et al. |
| 5,050,673 A | 9/1991 | Baldridge |
| 5,114,239 A | 5/1992 | Allen |
| 5,130,628 A | 7/1992 | Owen |
| 5,131,472 A | 7/1992 | Dees et al. |
| 5,172,009 A | 12/1992 | Mohan |
| 5,189,388 A | 2/1993 | Mosley et al. |
| 5,230,366 A | 7/1993 | Marandi |
| 5,293,947 A | 3/1994 | Stratton |
| 5,334,899 A | 8/1994 | Skybyk |
| 5,366,324 A | 11/1994 | Arlt et al. |
| 5,422,550 A | 6/1995 | McClanahan et al. |
| 5,433,243 A | 7/1995 | Griswold et al. |
| 5,439,066 A | 8/1995 | Gipson |
| 5,486,047 A | 1/1996 | Zimmerman |
| 5,517,822 A | 5/1996 | Haws et al. |
| 5,548,093 A | 8/1996 | Sato |
| 5,549,285 A | 8/1996 | Collins |
| 5,590,976 A | 1/1997 | Kilheffer et al. |
| 5,655,361 A | 8/1997 | Kishi |
| 5,736,838 A | 4/1998 | Dove et al. |
| 5,755,096 A | 5/1998 | Holleyman |
| 5,790,972 A | 8/1998 | Kohlenberger |
| 5,791,636 A | 8/1998 | Loziuk |
| 5,798,596 A | 8/1998 | Lordo |
| 5,813,455 A | 9/1998 | Pratt et al. |
| 5,865,247 A | 2/1999 | Peterson et al. |
| 5,879,137 A | 3/1999 | Yie |
| 5,894,888 A | 4/1999 | Wiemers et al. |
| 5,907,970 A | 6/1999 | Havlovick et al. |
| 5,950,726 A | 9/1999 | Roberts |
| 6,035,265 A | 3/2000 | Dister et al. |
| 6,097,310 A | 8/2000 | Harrell et al. |
| 6,116,040 A | 9/2000 | Stark |
| 6,121,705 A | 9/2000 | Hoong |
| 6,138,764 A | 10/2000 | Scarsdale et al. |
| 6,142,878 A | 11/2000 | Barin |
| 6,164,910 A | 12/2000 | Mayleben |
| 6,202,702 B1 | 3/2001 | Ohira et al. |
| 6,208,098 B1 | 3/2001 | Kume et al. |
| 6,254,462 B1 | 7/2001 | Kelton et al. |
| 6,271,637 B1 | 8/2001 | Kushion |
| 6,273,193 B1 | 8/2001 | Hermann et al. |
| 6,315,523 B1 | 11/2001 | Mills |
| 6,406,011 B1 | 6/2002 | Kosar et al. |
| 6,442,942 B1 | 9/2002 | Kopko |
| 6,477,852 B2 | 11/2002 | Dodo et al. |
| 6,484,490 B1 | 11/2002 | Olsen et al. |
| 6,491,098 B1 | 12/2002 | Dallas |
| 6,510,695 B1 | 1/2003 | Fisher |
| 6,529,135 B1 | 3/2003 | Bowers et al. |
| 6,560,131 B1 | 5/2003 | vonBrethorst |
| 6,585,455 B1 | 7/2003 | Petersen et al. |
| 6,626,646 B2 | 9/2003 | Rajewski |
| 6,633,727 B2 | 10/2003 | Henrie et al. |
| 6,719,900 B2 | 4/2004 | Hawkins |
| 6,765,304 B2 | 7/2004 | Baten et al. |
| 6,776,227 B2 | 8/2004 | Beida et al. |
| 6,788,022 B2 | 9/2004 | Sopko et al. |
| 6,802,690 B2 | 10/2004 | Han et al. |
| 6,808,303 B2 | 10/2004 | Fisher |
| 6,837,910 B1 | 1/2005 | Yoshikawa et al. |
| 6,931,310 B2 | 8/2005 | Shimizu et al. |
| 6,936,947 B1 | 8/2005 | Leijon et al. |
| 6,985,750 B1 | 1/2006 | Vicknair et al. |
| 7,082,993 B2 | 8/2006 | Ayoub et al. |
| 7,104,233 B2 | 9/2006 | Ryczek et al. |
| 7,170,262 B2 | 1/2007 | Pettigrew |
| 7,173,399 B2 | 2/2007 | Sihler et al. |
| 7,279,655 B2 | 10/2007 | Blutke et al. |
| 7,308,933 B1 | 12/2007 | Mayfield et al. |
| 7,309,835 B2 | 12/2007 | Morrison et al. |
| 7,312,593 B1 | 12/2007 | Streicher et al. |
| 7,336,514 B2 | 2/2008 | Amarillas et al. |
| 7,341,287 B2 | 3/2008 | Gibb et al. |
| 7,445,041 B2 | 11/2008 | O'Brien |
| 7,494,263 B2 | 2/2009 | Dykstra et al. |
| 7,500,642 B2 | 3/2009 | Cunningham et al. |
| 7,525,264 B2 | 4/2009 | Dodge |
| 7,563,076 B2 | 7/2009 | Brunet et al. |
| 7,581,379 B2 | 9/2009 | Yoshida et al. |
| 7,675,189 B2 | 3/2010 | Grenier |
| 7,683,499 B2 | 3/2010 | Saucier |
| 7,717,193 B2 | 5/2010 | Egilsson et al. |
| 7,755,310 B2 | 7/2010 | West et al. |
| 7,770,396 B2 | 8/2010 | Roby et al. |
| 7,795,830 B2 | 9/2010 | Johnson |

(56) References Cited

U.S. PATENT DOCUMENTS

| | | |
|---|---|---|
| 7,807,048 B2 | 10/2010 | Collette |
| 7,835,140 B2 | 11/2010 | Mori et al. |
| 7,845,413 B2 | 12/2010 | Shampine et al. |
| 7,900,893 B2 | 3/2011 | Teurlay et al. |
| 7,926,562 B2 | 4/2011 | Poitzsch et al. |
| 7,894,757 B2 | 7/2011 | Matsuno |
| 7,977,824 B2 | 7/2011 | Halen et al. |
| 7,984,757 B1 | 7/2011 | Keast et al. |
| 8,037,936 B2 | 10/2011 | Neuroth et al. |
| 8,054,084 B2 | 11/2011 | Schulz et al. |
| 8,083,504 B2 | 12/2011 | Williams et al. |
| 8,091,928 B2 | 1/2012 | Carrier et al. |
| 8,096,354 B2 | 1/2012 | Poitzsch et al. |
| 8,096,891 B2 | 1/2012 | Lochtefeld et al. |
| 8,139,383 B2 | 3/2012 | Efraimsson et al. |
| 8,146,665 B2 | 4/2012 | Neal |
| 8,154,419 B2 | 4/2012 | Daussin et al. |
| 8,221,513 B2 | 7/2012 | Ariyapadi et al. |
| 8,232,892 B2 | 7/2012 | Overholt et al. |
| 8,261,528 B2 | 9/2012 | Chillar et al. |
| 8,272,439 B2 | 9/2012 | Strickland |
| 8,310,272 B2 | 11/2012 | Quarto |
| 8,354,817 B2 | 1/2013 | Yeh et al. |
| 8,474,521 B2 | 7/2013 | Kajaria et al. |
| RE44,444 E | 8/2013 | Dole et al. |
| 8,506,267 B2 | 8/2013 | Gambier et al. |
| 8,534,235 B2 | 9/2013 | Chandler |
| 8,556,302 B2 | 10/2013 | Dole |
| 8,573,303 B2 | 11/2013 | Kerfoot |
| 8,596,056 B2 | 12/2013 | Woodmansee et al. |
| 8,616,005 B1 | 12/2013 | Cousino, Sr. |
| 8,616,274 B2 | 12/2013 | Belcher et al. |
| 8,646,521 B2 | 2/2014 | Bowen |
| 8,692,408 B2 | 4/2014 | Zhang et al. |
| 8,727,068 B2 | 5/2014 | Bruin |
| 8,760,657 B2 | 6/2014 | Pope et al. |
| 8,763,387 B2 | 7/2014 | Schmidt |
| 8,774,972 B2 | 7/2014 | Rusnak et al. |
| 8,789,601 B2 | 7/2014 | Broussard et al. |
| 8,795,525 B2 | 8/2014 | McGinnis et al. |
| 8,800,652 B2 | 8/2014 | Bartko et al. |
| 8,807,960 B2 | 8/2014 | Stephenson et al. |
| 8,838,341 B2 | 9/2014 | Kumano |
| 8,851,860 B1 | 10/2014 | Mail |
| 8,857,506 B2 | 10/2014 | Stone, Jr. et al. |
| 8,893,787 B2 | 11/2014 | Tips et al. |
| 8,899,940 B2 | 12/2014 | Laugemors et al. |
| 8,905,056 B2 | 12/2014 | Kendrick |
| 8,905,138 B2 | 12/2014 | Lundstedt et al. |
| 8,997,904 B2 | 4/2015 | Cryer et al. |
| 9,018,881 B2 | 4/2015 | Mao et al. |
| 9,051,822 B2 | 6/2015 | Ayan et al. |
| 9,051,923 B2 | 6/2015 | Kuo |
| 9,061,223 B2 | 6/2015 | Winborn |
| 9,062,545 B2 | 6/2015 | Roberts et al. |
| 9,067,182 B2 | 6/2015 | Nichols et al. |
| 9,103,193 B2 | 8/2015 | Coli et al. |
| 9,119,326 B2 | 8/2015 | McDonnell et al. |
| 9,121,257 B2 | 9/2015 | Coli et al. |
| 9,140,105 B2 | 9/2015 | Pattillo |
| 9,140,110 B2 | 9/2015 | Coli et al. |
| 9,160,168 B2 | 10/2015 | Chapel et al. |
| 9,260,253 B2 | 2/2016 | Naizer et al. |
| 9,322,239 B2 | 4/2016 | Angeles Boza et al. |
| 9,324,049 B2 | 4/2016 | Thomeer et al. |
| 9,340,353 B2 | 5/2016 | Oren et al. |
| 9,353,593 B1 | 5/2016 | Lu et al. |
| 9,366,114 B2 | 6/2016 | Coli et al. |
| 9,410,410 B2 | 8/2016 | Broussard et al. |
| 9,450,385 B2 | 9/2016 | Kristensen |
| 9,475,020 B2 | 10/2016 | Coli et al. |
| 9,475,021 B2 | 10/2016 | Coli et al. |
| 9,475,840 B2 | 10/2016 | Lledó et al. |
| 9,482,086 B2 | 11/2016 | Richardson et al. |
| 9,499,335 B2 | 11/2016 | McIver et al. |
| 9,506,333 B2 | 11/2016 | Castillo et al. |
| 9,513,055 B1 | 12/2016 | Seal |
| 9,534,473 B2 | 1/2017 | Morris et al. |
| 9,562,420 B2 | 2/2017 | Morris et al. |
| 9,587,649 B2 | 3/2017 | Oehring |
| 9,611,728 B2 | 4/2017 | Oehring |
| 9,650,871 B2 | 5/2017 | Oehring et al. |
| 9,650,879 B2 | 5/2017 | Broussard et al. |
| 9,706,185 B2 | 7/2017 | Ellis |
| 9,728,354 B2 | 8/2017 | Skolozdra et al. |
| 9,738,461 B2 | 8/2017 | DeGaray et al. |
| 9,739,546 B2 | 8/2017 | Bertilsson et al. |
| 9,745,840 B2 | 8/2017 | Oehring et al. |
| 9,790,858 B2 | 10/2017 | Kanebako |
| 9,840,901 B2 | 12/2017 | Oehring et al. |
| 9,863,228 B2 | 1/2018 | Shampine et al. |
| 9,893,500 B2 | 2/2018 | Oehring et al. |
| 9,903,190 B2 | 2/2018 | Conrad et al. |
| 9,909,398 B2 | 3/2018 | Pham |
| 9,915,128 B2 | 3/2018 | Hunter |
| 9,932,799 B2 | 4/2018 | Symchuk |
| 9,945,365 B2 | 4/2018 | Hernandez et al. |
| 9,963,961 B2 | 5/2018 | Hardin |
| 9,970,278 B2 | 5/2018 | Broussard et al. |
| 9,976,351 B2 | 5/2018 | Randall |
| 9,995,218 B2 | 6/2018 | Oehring et al. |
| 10,008,880 B2 | 6/2018 | Vicknair et al. |
| 10,020,711 B2 | 7/2018 | Oehring et al. |
| 10,036,238 B2 | 7/2018 | Oehring |
| 10,107,086 B2 | 10/2018 | Oehring |
| 10,119,381 B2 | 11/2018 | Oehring et al. |
| 10,184,465 B2 | 1/2019 | Enis et al. |
| 10,196,878 B2 | 2/2019 | Hunter |
| 10,221,639 B2 | 3/2019 | Romer et al. |
| 10,227,854 B2 | 3/2019 | Glass |
| 10,232,332 B2 | 3/2019 | Oehring et al. |
| 10,246,984 B2 | 4/2019 | Payne et al. |
| 10,254,732 B2 | 4/2019 | Oehring et al. |
| 10,260,327 B2 | 4/2019 | Kajaria et al. |
| 10,280,724 B2 | 5/2019 | Hinderliter |
| 10,287,873 B2 | 5/2019 | Filas et al. |
| 10,302,079 B2 | 5/2019 | Kendrick |
| 10,309,205 B2 | 6/2019 | Randall |
| 10,337,308 B2 | 7/2019 | Broussard et al. |
| 10,371,012 B2 | 8/2019 | Davis et al. |
| 10,378,326 B2 | 8/2019 | Morris et al. |
| 10,393,108 B2 | 8/2019 | Chong et al. |
| 10,407,990 B2 | 9/2019 | Oehring et al. |
| 10,408,030 B2 | 9/2019 | Oehring et al. |
| 10,408,031 B2 | 9/2019 | Oehring et al. |
| 10,415,332 B2 | 9/2019 | Morris et al. |
| 10,436,026 B2 | 10/2019 | Ounadjela et al. |
| 10,480,300 B2 | 11/2019 | Guidry |
| 10,526,882 B2 | 1/2020 | Oehring et al. |
| 10,627,003 B2 | 4/2020 | Dale et al. |
| 10,648,270 B2 | 5/2020 | Brunty et al. |
| 10,648,311 B2 | 5/2020 | Oehring et al. |
| 10,669,471 B2 | 6/2020 | Schmidt et al. |
| 10,669,804 B2 | 6/2020 | Kotrla et al. |
| 10,686,301 B2 | 6/2020 | Oehring et al. |
| 10,690,131 B2 | 6/2020 | Rashid et al. |
| 10,695,950 B2 | 6/2020 | Igo et al. |
| 10,711,576 B2 | 7/2020 | Bishop |
| 10,731,561 B2 | 8/2020 | Oehring et al. |
| 10,740,730 B2 | 8/2020 | Altamirano et al. |
| 10,767,561 B2 | 9/2020 | Brady |
| 10,781,752 B2 | 9/2020 | Kikkawa et al. |
| 10,794,165 B2 | 10/2020 | Fischer et al. |
| 10,934,824 B2 | 3/2021 | Oehring et al. |
| 10,988,998 B2 | 4/2021 | Fischer et al. |
| 2001/0000996 A1 | 5/2001 | Grimland et al. |
| 2002/0169523 A1 | 11/2002 | Ross et al. |
| 2003/0000759 A1 | 1/2003 | Schmitz et al. |
| 2003/0079875 A1 | 1/2003 | Weng |
| 2003/0056514 A1 | 3/2003 | Lohn |
| 2003/0057704 A1 | 3/2003 | Baten et al. |
| 2003/0138327 A1 | 7/2003 | Jones et al. |
| 2004/0040746 A1 | 3/2004 | Niedermayr et al. |
| 2004/0045703 A1 | 3/2004 | Hooper et al. |

(56) References Cited

U.S. PATENT DOCUMENTS

| | | |
|---|---|---|
| 2004/0102109 A1 | 5/2004 | Cratty et al. |
| 2004/0167738 A1 | 8/2004 | Miller |
| 2004/0212679 A1 | 10/2004 | Jun |
| 2005/0061548 A1 | 3/2005 | Hooper et al. |
| 2005/0116541 A1 | 6/2005 | Seiver |
| 2005/0201197 A1 | 9/2005 | Duell et al. |
| 2005/0274508 A1 | 12/2005 | Folk et al. |
| 2006/0052903 A1 | 3/2006 | Bassett |
| 2006/0065319 A1 | 3/2006 | Csitari |
| 2006/0109141 A1 | 5/2006 | Huang et al. |
| 2007/0125544 A1 | 6/2007 | Robinson et al. |
| 2007/0131410 A1 | 6/2007 | Hill et al. |
| 2007/0187163 A1 | 8/2007 | Cone et al. |
| 2007/0201305 A1 | 8/2007 | Heilman et al. |
| 2007/0226089 A1 | 9/2007 | DeGaray et al. |
| 2007/0277982 A1 | 12/2007 | Shampine et al. |
| 2007/0278140 A1 | 12/2007 | Mallet et al. |
| 2008/0017369 A1 | 1/2008 | Sarada |
| 2008/0041596 A1 | 2/2008 | Blount et al. |
| 2008/0095644 A1 | 4/2008 | Mantei et al. |
| 2008/0112802 A1 | 5/2008 | Orlando et al. |
| 2008/0137266 A1 | 6/2008 | Jensen et al. |
| 2008/0142304 A1 | 6/2008 | Schutz et al. |
| 2008/0164023 A1 | 7/2008 | Dykstra et al. |
| 2008/0208478 A1 | 8/2008 | Ella et al. |
| 2008/0217024 A1 | 9/2008 | Moore |
| 2008/0236818 A1 | 10/2008 | Dykstra |
| 2008/0257449 A1 | 10/2008 | Weinstein et al. |
| 2008/0264625 A1 | 10/2008 | Ochoa |
| 2008/0264649 A1 | 10/2008 | Crawford |
| 2008/0277120 A1 | 11/2008 | Hickie |
| 2009/0045782 A1 | 2/2009 | Datta et al. |
| 2009/0065299 A1 | 3/2009 | Vito et al. |
| 2009/0068031 A1 | 3/2009 | Gambier et al. |
| 2009/0072645 A1 | 3/2009 | Quere |
| 2009/0078410 A1 | 3/2009 | Krenek et al. |
| 2009/0093317 A1 | 4/2009 | Kajiwara et al. |
| 2009/0095482 A1 | 4/2009 | Surjaatmadja |
| 2009/0114392 A1 | 5/2009 | Tolman et al. |
| 2009/0122578 A1 | 5/2009 | Beltran |
| 2009/0145611 A1 | 6/2009 | Pallini, Jr. et al. |
| 2009/0153354 A1 | 6/2009 | Daussin et al. |
| 2009/0188181 A1 | 7/2009 | Forbis et al. |
| 2009/0200035 A1 | 8/2009 | Bjerkreim et al. |
| 2009/0200290 A1 | 8/2009 | Cardinal et al. |
| 2009/0260826 A1 | 10/2009 | Sherwood et al. |
| 2009/0308602 A1 | 12/2009 | Bruins et al. |
| 2009/0315297 A1 | 12/2009 | Nadeau et al. |
| 2010/0000508 A1 | 1/2010 | Chandler |
| 2010/0019574 A1 | 1/2010 | Baldassarre et al. |
| 2010/0038907 A1 | 2/2010 | Hunt et al. |
| 2010/0045109 A1 | 2/2010 | Arnold |
| 2010/0051272 A1 | 3/2010 | Loree et al. |
| 2010/0132949 A1 | 6/2010 | DeFosse et al. |
| 2010/0146981 A1 | 6/2010 | Motakef et al. |
| 2010/0172202 A1 | 7/2010 | Borgstadt |
| 2010/0193057 A1 | 8/2010 | Garner et al. |
| 2010/0250139 A1 | 9/2010 | Hobbs et al. |
| 2010/0281876 A1 | 11/2010 | Khan et al. |
| 2010/0293973 A1 | 11/2010 | Erickson |
| 2010/0303655 A1 | 12/2010 | Scekic |
| 2010/0322802 A1 | 12/2010 | Kugelev |
| 2011/0005757 A1 | 1/2011 | Hebert |
| 2011/0017468 A1 | 1/2011 | Birch et al. |
| 2011/0042387 A1 | 2/2011 | Henry et al. |
| 2011/0052423 A1 | 3/2011 | Gambier et al. |
| 2011/0061855 A1 | 3/2011 | Case et al. |
| 2011/0063942 A1 | 3/2011 | Hagan et al. |
| 2011/0081268 A1 | 4/2011 | Ochoa et al. |
| 2011/0085924 A1 | 4/2011 | Shampine et al. |
| 2011/0097988 A1 | 4/2011 | Lord |
| 2011/0110793 A1 | 5/2011 | Leugemores et al. |
| 2011/0166046 A1 | 7/2011 | Weaver et al. |
| 2011/0175397 A1 | 7/2011 | Amrine, Jr. et al. |
| 2011/0197988 A1 | 8/2011 | Van Vliet et al. |
| 2011/0241590 A1 | 10/2011 | Horikoshi et al. |
| 2011/0247878 A1 | 10/2011 | Rasheed |
| 2011/0272158 A1 | 11/2011 | Neal |
| 2012/0018016 A1 | 1/2012 | Gibson et al. |
| 2012/0049625 A1 | 3/2012 | Hopwood |
| 2012/0063936 A1 | 3/2012 | Baxter et al. |
| 2012/0085541 A1 | 4/2012 | Love et al. |
| 2012/0111560 A1 | 5/2012 | Hill et al. |
| 2012/0112757 A1 | 5/2012 | Vrankovic et al. |
| 2012/0127635 A1 | 5/2012 | Grindeland |
| 2012/0150455 A1 | 6/2012 | Franklin et al. |
| 2012/0152716 A1 | 6/2012 | Kikukawa et al. |
| 2012/0205301 A1 | 8/2012 | McGuire et al. |
| 2012/0205400 A1 | 8/2012 | DeGaray et al. |
| 2012/0217067 A1 | 8/2012 | Mebane, III et al. |
| 2012/0222865 A1 | 9/2012 | Larson et al. |
| 2012/0232728 A1 | 9/2012 | Karimi et al. |
| 2012/0247783 A1 | 10/2012 | Berner, Jr. et al. |
| 2012/0255734 A1 | 10/2012 | Coli et al. |
| 2013/0009469 A1 | 1/2013 | Gillett |
| 2013/0025706 A1 | 1/2013 | DeGaray et al. |
| 2013/0051971 A1 | 2/2013 | Wyse et al. |
| 2013/0078114 A1 | 3/2013 | Van Rijswick et al. |
| 2013/0138254 A1 | 5/2013 | Seals et al. |
| 2013/0175038 A1 | 7/2013 | Conrad |
| 2013/0175039 A1 | 7/2013 | Guidry |
| 2013/0180722 A1 | 7/2013 | Caro et al. |
| 2013/0189629 A1 | 7/2013 | Chandler |
| 2013/0199617 A1 | 8/2013 | DeGaray et al. |
| 2013/0233542 A1 | 9/2013 | Shampine et al. |
| 2013/0255271 A1 | 10/2013 | Yu et al. |
| 2013/0284278 A1 | 10/2013 | Winborn |
| 2013/0284455 A1 | 10/2013 | Kajaria et al. |
| 2013/0299167 A1 | 11/2013 | Fordyce et al. |
| 2013/0306322 A1 | 11/2013 | Sanborn et al. |
| 2013/0317750 A1 | 11/2013 | Hunter |
| 2013/0341029 A1 | 12/2013 | Roberts et al. |
| 2013/0343858 A1 | 12/2013 | Flusche |
| 2014/0000899 A1 | 1/2014 | Nevison |
| 2014/0010671 A1 | 1/2014 | Cryer et al. |
| 2014/0048255 A1 | 2/2014 | Baca et al. |
| 2014/0054965 A1 | 2/2014 | Jain |
| 2014/0060658 A1 | 3/2014 | Hains et al. |
| 2014/0077607 A1 | 3/2014 | Clarke et al. |
| 2014/0095114 A1 | 4/2014 | Thomeer et al. |
| 2014/0096974 A1 | 4/2014 | Coli et al. |
| 2014/0124162 A1 | 5/2014 | Leavitt |
| 2014/0138079 A1 | 5/2014 | Broussard et al. |
| 2014/0158345 A1 | 6/2014 | Jang et al. |
| 2014/0174691 A1 | 6/2014 | Kamps et al. |
| 2014/0174717 A1 | 6/2014 | Broussard et al. |
| 2014/0219824 A1 | 8/2014 | Burnette |
| 2014/0238683 A1 | 8/2014 | Korach et al. |
| 2014/0246211 A1 | 9/2014 | Guidry et al. |
| 2014/0251623 A1 | 9/2014 | Lestz et al. |
| 2014/0255214 A1 | 9/2014 | Burnette |
| 2014/0273128 A1 | 9/2014 | Coleman et al. |
| 2014/0277772 A1 | 9/2014 | Lopez et al. |
| 2014/0290768 A1 | 10/2014 | Rendle et al. |
| 2014/0379300 A1 | 12/2014 | Devine et al. |
| 2015/0027712 A1 | 1/2015 | Vicknair et al. |
| 2015/0038021 A1 | 2/2015 | Gilliam |
| 2015/0053426 A1 | 2/2015 | Smith et al. |
| 2015/0068724 A1 | 3/2015 | Coli et al. |
| 2015/0068754 A1 | 3/2015 | Coli et al. |
| 2015/0075778 A1 | 3/2015 | Walters et al. |
| 2015/0083426 A1 | 3/2015 | Lesko et al. |
| 2015/0097504 A1 | 4/2015 | Lamascus et al. |
| 2015/0114652 A1 | 4/2015 | Lestz et al. |
| 2015/0136043 A1 | 5/2015 | Shaaban et al. |
| 2015/0144336 A1 | 5/2015 | Hardin et al. |
| 2015/0147194 A1 | 5/2015 | Foote |
| 2015/0159911 A1 | 6/2015 | Holt |
| 2015/0175013 A1 | 6/2015 | Cryer et al. |
| 2015/0176386 A1 | 6/2015 | Castillo et al. |
| 2015/0211512 A1 | 7/2015 | Wiegman et al. |
| 2015/0211524 A1 | 7/2015 | Broussard et al. |
| 2015/0217672 A1 | 8/2015 | Shampine et al. |
| 2015/0225113 A1 | 8/2015 | Lungu et al. |

(56) References Cited

U.S. PATENT DOCUMENTS

| | | |
|---|---|---|
| 2015/0233530 A1 | 8/2015 | Sandidge |
| 2015/0252661 A1 | 9/2015 | Glass |
| 2015/0300145 A1 | 10/2015 | Coli et al. |
| 2015/0300336 A1 | 10/2015 | Hernandez et al. |
| 2015/0314225 A1 | 11/2015 | Coli et al. |
| 2015/0330172 A1 | 11/2015 | Allmaras et al. |
| 2015/0354322 A1 | 12/2015 | Vicknair |
| 2016/0006311 A1 | 1/2016 | Li |
| 2016/0032703 A1 | 2/2016 | Broussard et al. |
| 2016/0102537 A1 | 4/2016 | Lopez |
| 2016/0105022 A1 | 4/2016 | Oehring et al. |
| 2016/0208592 A1 | 4/2016 | Oehring |
| 2016/0160889 A1 | 6/2016 | Hoffman et al. |
| 2016/0177675 A1 | 6/2016 | Morris et al. |
| 2016/0177678 A1 | 6/2016 | Morris et al. |
| 2016/0186531 A1 | 6/2016 | Harkless et al. |
| 2016/0208593 A1 | 7/2016 | Coli et al. |
| 2016/0208594 A1 | 7/2016 | Coli et al. |
| 2016/0208595 A1 | 7/2016 | Tang et al. |
| 2016/0221220 A1 | 8/2016 | Paige |
| 2016/0230524 A1 | 8/2016 | Dumoit et al. |
| 2016/0230525 A1 | 8/2016 | Lestz et al. |
| 2016/0230660 A1 | 8/2016 | Zeitoun et al. |
| 2016/0258267 A1 | 9/2016 | Payne et al. |
| 2016/0265457 A1 | 9/2016 | Stephenson et al. |
| 2016/0273328 A1 | 9/2016 | Oehring |
| 2016/0273456 A1 | 9/2016 | Zhang et al. |
| 2016/0281484 A1 | 9/2016 | Lestz et al. |
| 2016/0290114 A1 | 10/2016 | Oehring et al. |
| 2016/0312108 A1 | 10/2016 | Diggns |
| 2016/0319649 A1 | 11/2016 | Oehring |
| 2016/0319650 A1 | 11/2016 | Oehring et al. |
| 2016/0326853 A1 | 11/2016 | Fredd et al. |
| 2016/0326854 A1 | 11/2016 | Broussard et al. |
| 2016/0326855 A1 | 11/2016 | Coli et al. |
| 2016/0341281 A1 | 11/2016 | Brunvold et al. |
| 2016/0348479 A1 | 12/2016 | Oehring et al. |
| 2016/0349728 A1 | 12/2016 | Oehring et al. |
| 2016/0369609 A1 | 12/2016 | Morris et al. |
| 2017/0016433 A1 | 1/2017 | Chong et al. |
| 2017/0021318 A1 | 1/2017 | McIver et al. |
| 2017/0022788 A1 | 1/2017 | Oehring et al. |
| 2017/0022807 A1 | 1/2017 | Dursun et al. |
| 2017/0028368 A1 | 2/2017 | Oehring et al. |
| 2017/0030177 A1 | 2/2017 | Oehring et al. |
| 2017/0036178 A1 | 2/2017 | Coli et al. |
| 2017/0036872 A1 | 2/2017 | Wallace et al. |
| 2017/0037717 A1 | 2/2017 | Oehring et al. |
| 2017/0037718 A1 | 2/2017 | Coli et al. |
| 2017/0043280 A1 | 2/2017 | Vankouwenberg |
| 2017/0051732 A1 | 2/2017 | Hemandez et al. |
| 2017/0074076 A1 | 3/2017 | Joseph et al. |
| 2017/0082033 A1 | 3/2017 | Wu et al. |
| 2017/0096885 A1 | 4/2017 | Oehring et al. |
| 2017/0096889 A1 | 4/2017 | Blanckaert et al. |
| 2017/0104389 A1 | 4/2017 | Morris et al. |
| 2017/0114625 A1 | 4/2017 | Norris et al. |
| 2017/0130743 A1 | 5/2017 | Anderson |
| 2017/0138171 A1 | 5/2017 | Richards et al. |
| 2017/0146189 A1 | 5/2017 | Herman et al. |
| 2017/0159570 A1 | 6/2017 | Bickert |
| 2017/0159654 A1 | 6/2017 | Kendrick |
| 2017/0175516 A1 | 6/2017 | Eslinger |
| 2017/0204852 A1 | 7/2017 | Barnett, Jr. |
| 2017/0212535 A1 | 7/2017 | Shelman et al. |
| 2017/0218727 A1 | 8/2017 | Oehring et al. |
| 2017/0218843 A1 | 8/2017 | Oehring et al. |
| 2017/0222409 A1 | 8/2017 | Oehring et al. |
| 2017/0226838 A1 | 8/2017 | Ciezobka et al. |
| 2017/0226839 A1 | 8/2017 | Broussard et al. |
| 2017/0226842 A1 | 8/2017 | Omont et al. |
| 2017/0234250 A1 | 8/2017 | Janik et al. |
| 2017/0241221 A1 | 8/2017 | Seshadri et al. |
| 2017/0259227 A1 | 9/2017 | Morris et al. |
| 2017/0292513 A1 | 10/2017 | Haddad et al. |
| 2017/0302218 A1 | 10/2017 | Janik |
| 2017/0313499 A1 | 11/2017 | Hughes et al. |
| 2017/0314380 A1 | 11/2017 | Oehring et al. |
| 2017/0314979 A1 | 11/2017 | Ye et al. |
| 2017/0328179 A1 | 11/2017 | Dykstra et al. |
| 2017/0369258 A1 | 12/2017 | DeGaray et al. |
| 2017/0370639 A1 | 12/2017 | Bardon et al. |
| 2018/0028992 A1 | 2/2018 | Stegemoeller et al. |
| 2018/0038216 A1 | 2/2018 | Zhang et al. |
| 2018/0045331 A1 | 2/2018 | Lopez et al. |
| 2018/0090914 A1 | 3/2018 | Johnson et al. |
| 2018/0156210 A1 | 6/2018 | Oehring et al. |
| 2018/0181830 A1 | 6/2018 | Luharuka et al. |
| 2018/0183219 A1 | 6/2018 | Oehring et al. |
| 2018/0216455 A1 | 8/2018 | Andreychuk et al. |
| 2018/0238147 A1 | 8/2018 | Shahri et al. |
| 2018/0245428 A1 | 8/2018 | Richards |
| 2018/0258746 A1 | 9/2018 | Broussard et al. |
| 2018/0259080 A1 | 9/2018 | Dale et al. |
| 2018/0266217 A1 | 9/2018 | Funkhauser et al. |
| 2018/0266412 A1 | 9/2018 | Stokkevag et al. |
| 2018/0274446 A1 | 9/2018 | Oehring et al. |
| 2018/0284817 A1 | 10/2018 | Cook et al. |
| 2018/0291713 A1 | 10/2018 | Jeanson |
| 2018/0298731 A1 | 10/2018 | Bishop |
| 2018/0312738 A1 | 11/2018 | Rutsch et al. |
| 2018/0313677 A1 | 11/2018 | Warren et al. |
| 2018/0320483 A1 | 11/2018 | Zhang et al. |
| 2018/0343125 A1 | 11/2018 | Clish et al. |
| 2018/0363437 A1 | 12/2018 | Coli et al. |
| 2018/0363640 A1 | 12/2018 | Kajita et al. |
| 2018/0366950 A1 | 12/2018 | Pedersen et al. |
| 2019/0003329 A1 | 1/2019 | Morris et al. |
| 2019/0010793 A1 | 1/2019 | Hinderliter |
| 2019/0011066 A1 | 1/2019 | Ungchusri et al. |
| 2019/0040727 A1 | 2/2019 | Oehring et al. |
| 2019/0063309 A1 | 2/2019 | Davis |
| 2019/0100989 A1 | 4/2019 | Stewart et al. |
| 2019/0112910 A1 | 4/2019 | Oehring et al. |
| 2019/0119096 A1 | 4/2019 | Haile et al. |
| 2019/0120024 A1 | 4/2019 | Oehring et al. |
| 2019/0128080 A1 | 5/2019 | Ross et al. |
| 2019/0128104 A1 | 5/2019 | Graham et al. |
| 2019/0145251 A1 | 5/2019 | Johnson |
| 2019/0154020 A1 | 5/2019 | Glass |
| 2019/0162061 A1 | 5/2019 | Stephenson |
| 2019/0169971 A1 | 6/2019 | Oehring et al. |
| 2019/0178057 A1 | 6/2019 | Hunter |
| 2019/0178235 A1 | 6/2019 | Coskrey et al. |
| 2019/0203567 A1 | 7/2019 | Ross et al. |
| 2019/0203572 A1 | 7/2019 | Morris et al. |
| 2019/0211661 A1 | 7/2019 | Reckels et al. |
| 2019/0245348 A1 | 8/2019 | Hinderliter et al. |
| 2019/0249527 A1 | 8/2019 | Kraynek |
| 2019/0257462 A1 | 8/2019 | Rogers |
| 2019/0292866 A1 | 9/2019 | Ross et al. |
| 2019/0292891 A1 | 9/2019 | Kajaria et al. |
| 2019/0226317 A1 | 10/2019 | Payne et al. |
| 2019/0316447 A1 | 10/2019 | Oehring et al. |
| 2019/0383123 A1 | 12/2019 | Hinderliter |
| 2020/0040878 A1 | 2/2020 | Morris |
| 2020/0047141 A1 | 2/2020 | Oehring et al. |
| 2020/0088152 A1 | 3/2020 | Allion et al. |
| 2020/0232454 A1 | 7/2020 | Chretien et al. |
| 2020/0325760 A1 | 10/2020 | Markham |
| 2020/0350790 A1 | 11/2020 | Luft et al. |
| 2021/0032961 A1 | 2/2021 | Hinderliter et al. |
| 2021/0131248 A1 | 5/2021 | Hinderliter et al. |

FOREIGN PATENT DOCUMENTS

| | | |
|---|---|---|
| CA | 2482943 A1 | 10/2003 |
| CA | 2707269 A1 | 12/2010 |
| CA | 2797081 A1 | 11/2011 |
| CA | 3050131 A1 | 11/2011 |
| CA | 2955706 A1 | 10/2012 |
| CA | 2966672 A1 | 10/2012 |
| CA | 2849825 A1 | 4/2013 |
| CA | 3000322 A1 | 4/2013 |

(56) References Cited

FOREIGN PATENT DOCUMENTS

| | | |
|---|---|---|
| CA | 2787814 A1 | 2/2014 |
| CA | 2833711 A1 | 5/2014 |
| CA | 2919649 A1 | 8/2016 |
| CA | 2919666 A1 | 8/2016 |
| CA | 2978706 A1 | 9/2016 |
| CA | 2944980 A1 | 4/2017 |
| CA | 2945579 A1 | 4/2017 |
| CA | 3006422 A1 | 6/2017 |
| CA | 3018485 A1 | 8/2017 |
| CA | 2964593 A1 | 10/2017 |
| CA | 3067854 A1 | 1/2019 |
| CN | 101977016 A | 2/2011 |
| CN | 104117308 A | 10/2014 |
| CN | 104196613 A | 12/2014 |
| CN | 205986303 U | 2/2017 |
| CN | 108049999 A | 5/2018 |
| CN | 112196508 A | 1/2021 |
| JP | 2004264589 A | 9/2004 |
| WO | 0047893 A1 | 8/2000 |
| WO | 2007055587 A1 | 5/2007 |
| WO | 2009046280 A1 | 4/2009 |
| WO | 2012051705 A1 | 4/2012 |
| WO | 201411676 A1 | 7/2014 |
| WO | 2014105642 A1 | 7/2014 |
| WO | 2014177346 A1 | 11/2014 |
| WO | 2016144939 A1 | 9/2016 |
| WO | 2016160458 A1 | 10/2016 |
| WO | 2018044307 A1 | 3/2018 |
| WO | 2018213925 A1 | 11/2018 |
| WO | 2019210417 A1 | 11/2019 |

OTHER PUBLICATIONS

Canadian Office Action issued in Canadian Application No. 2,928,707, dated Sep. 8, 2020.
Canadian Office Action issued in Canadian Application No. 2,944,980, dated Aug. 31, 2020.
Canadian Office Action issued in Canadian Application No. 2,982,974, dated Sep. 22, 2020.
Final Office Action issued in corresponding U.S. Appl. No. 15/356,436, dated Mar. 31, 2020.
Final Office Action issued in corresponding U.S. Appl. No. 16/404,283, dated Jan. 11, 2021.
Final Office Action issued in corresponding U.S. Appl. No. 16/597,014, dated Feb. 4, 2021.
Goodwin, "High-voltage auxiliary switchgear for power stations," Power Engineering Journal, 1989, 10 pg. (Year 1989).
"Heat Exchanger" (https://en.wikipedia.org/w/index.php?title=Heat_exchanger&oldid=89300146) 12-18-19 Apr. 2019 (Apr. 18, 2019), entire document, especially para (0001].
International Search Report and Written Opinion issued in PCT Application No. PCT/US2020/023809, dated Jun. 2, 2020.
International Search Report and Written Opinion issued in PCT Application No. PCT/US2020/023821, dated Aug. 28, 2020.
International Search Report and Written Opinion issued in PCT Application No. PCT/US2020/036932, dated Sep. 3, 2020.
International Search Report and Written Opinion issued in PCT Application No. PCT/US2020/053980, dated Dec. 14, 2020.
International Search Report and Written Opinion issued in PCT Application No. PCT/US2020/058899, dated Feb. 3, 2021.
International Search Report and Written Opinion issued in PCT Application No. PCT/US2020/058906, dated Feb. 2, 2021.
International Search Report and Written Opinion issued in PCT Application No. PCT/US2020/059834, dated Feb. 4, 2021.
International Search Report and Written Opinion issued in PCT Application No. PCT/US2020/066543, dated May 11, 2021.
International Search Report and Written Opinion issued in PCT Application No. PCT/US2020/067146, dated Mar. 29, 2021.
International Search Report and Written Opinion issued in PCT Application No. PCT/US2020/067523, dated Mar. 22, 2021.
International Search Report and Written Opinion issued in PCT Application No. PCT/US2020/067526, dated May 6, 2021.
International Search Report and Written Opinion issued in PCT Application No. PCT/US2020/067528, dated Mar. 19, 2021.
International Search Report and Written Opinion issued in PCT Application No. PCT/US2020/067608, dated Mar. 30, 2021.
Karin, "Duel Fuel Diesel Engines," (2015). Taylor & Francis, pp. 62-63, retrieved from https://app.knovel.com/hotlink/oc/id:kpDFDE0001/dual-fuel-diesel-engines/duel-duel-diesel-engines (Year 2015).
Morris et al., U.S. Appl. No. 62/526,869; Hydration-Blender Transport and Electric Power Distribution for Fracturing Operation; Jun. 28, 2018; USPTO; see entire document.
Non-Final Office Action issued in corresponding U.S. Appl. No. 14/881,525, dated Jul. 21, 2021.
Non-Final Office Action issued in corresponding U.S. Appl. No. 14/622,532, dated Aug. 5, 2015.
Non-Final Office Action issued in corresponding U.S. Appl. No. 15/145,443, dated May 8, 2020.
Non-Final Office Action issued in corresponding U.S. Appl. No. 15/356,436, dated Oct. 26, 2020.
Non-Final Office Action issued in corresponding U.S. Appl. No. 16/167,083, dated Aug. 31, 2020.
Non-Final Office Action issued in corresponding U.S. Appl. No. 16/356,263, dated Sep. 2, 2020.
Non-Final Office Action issued in corresponding U.S. Appl. No. 16/377,861, dated Jun. 22, 2020.
Non-Final Office Action issued in corresponding U.S. Appl. No. 16/404,283, dated Jun. 29, 2020.
Non-Final Office Action issued in corresponding U.S. Appl. No. 16/443,273, dated Oct. 5, 2020.
Non-Final Office Action issued in corresponding U.S. Appl. No. 16/458,696, dated May 22, 2020.
Non-Final Office Action issued in corresponding U.S. Appl. No. 16/522,043, dated Jan. 4, 2021.
Non-Final Office Action issued in corresponding U.S. Appl. No. 16/564,185, dated Jan. 29, 2021.
Final Office Action issued in corresponding U.S. Appl. No. 15/145,491, dated Sep. 6, 2017.
Non-Final Office Action issued in corresponding U.S. Appl. No. 16/871,928, dated Aug. 25, 2021.
Non-Final Office Action issued in corresponding U.S. Appl. No. 16/943,727, dated Aug. 3, 2021.
Non-Final Office Action issued in corresponding U.S. Appl. No. 15/183,387, dated Mar. 6, 2019.
Notice of Allowance issued in corresponding U.S. Appl. No. 15/829,419, dated Jul. 26, 2021.
Canadian Office Action issued in Canadian Application No. 2,928,711, dated Apr. 18, 2018.
"Water and Glycol Heating Systems" (https://www.heat-inc.com/wg-series-water-glycol-systems/) Jun. 18, 2018 (Jun. 18, 2018), entire document, especially WG Series Water Glycol Systems.
Woodbury et al., "Electric Design Considerations for Drilling Rigs," IEEE Transactions on Industry Applications, vol. 1A-12, No. 4, Jul./Aug. 1976, pp. 421-431.
Canadian Office Action issued in Canadian Application No. 2,833,711, dated Mar. 2, 2018.
International Search Report and Written Opinion issued in PCT Application No. PCT/US2020/044274, Nov. 24, 2020.
Canadian Office Action issued in Canadian Application No. 2,886,697, dated Jun. 22, 2018.
Canadian Office Action issued in Canadian Application No. 2,933,444, dated Aug. 18, 2020.
Canadian Office Action issued in Canadian Application No. 2,936,997, dated Jan. 30, 2019.
Non-Final Office Action issued in corresponding U.S. Appl. No. 15/294,349, dated Mar. 14, 2017.
Mistry et al., "Induction Motor Vibrations in View of the API 541-4th edition," IEEE, Paper No. PCIC-, 2008, 10 pages.
Paschall et al., "Navigating the Test Requirements of API 541 4th Edition," IEEE, Paper No. PCIC-2007-11, 2007, 12 pages.
"G7 Adjustable Speed Drive Operation Manual," Toshiba, Document No. 51546-009, Mar. 2005, 221 pages.

(56) References Cited

OTHER PUBLICATIONS

"Weir SPM: General Catalog," Weir SPM, 2009, 40 pages.
Krueger, "Advances in Well Completion and Stimulation During JPT's First Quarter Century," Journal of Petroleum Technology, Dec. 1973, pp. 16.
Lietard et al., "Hydraulic Fracturing of Horizontal Wells: An Update of Design and Execution Guidelines," Society of Petroleum Engineers, SPE 37122, 1996, 15 pages.
Waters et al., "Simultaneous Hydraulic Fracturing of Adjacent Horizontal Wells in the Woodford Shale," Society of Petroleum Engineers, SPE 119635, 2009, 22 pages.
Bahadori et al., "Dictionary of Oil, Gas, and Petrochemical Processing," CRC Press, ISBN: 978-1-4665-8825-7, 2014, 8 pages.
"A Dictionary for the Oil and Gas Company—Second Edition," The University of Texas at Austin—Petroleum Extension Service, ISBN: 978-0-88698-240-9, 2011, 7 pages.
"Lessons Learned from Natural Gas STAR Partners: Reduced Emissions Completions for Hydraulically Fractured Natural Gas Wells," U.S. Environmental Protection Agency, 2011, 12 pages.
Kidnay et al., "Fundamentals of Natural Gas Processing—Second Edition," CRS Press, ISBN: 978-1-4200-8519-8, 2011, 19 pages (Part 1).
Kidnay et al., "Fundamentals of Natural Gas Processing—Second Edition," CRS Press, ISBN: 978-1-4200-8519-8, 2011, 17 pages (Part 2).
Kidnay et al., "Fundamentals of Natural Gas Processing—Second Edition," CRS Press, ISBN: 978-1-4200-8519-8, 2011, 12 pages (Part 3).
Listing at Amazon.com for Kidnay et al., "Fundamentals of Natural Gas Processing—Second Edition," CRS Press, ISBN: 978-1-4200-8519-8, Jul. 7, 2013, 4 pages.
Listing at Amazon.com for Kidnay et al., "Fundamentals of Natural Gas Processing—Second Edition," CRS Press, ISBN: 978-1-4200-8519-8, Feb. 22, 2015, 4 pages.
"Green Completions," IPIECA, Jan. 20, 2015, 7 pages.
"Sand Trap FAQ," Mountain Equipment of New Mexico, Inc., Jan. 8, 2014, 2 pages.
"Test Separators FAQ," Mountain Equipment of New Mexico, Inc., Jan. 8, 2014, 2 pages.
"Emergency Power Systems for Critical Facilities: A Best Practices Approach to Improving Reliability," FEMA, FEMA P-1019. Sep. 2014, 170 pages.
Persily et al., "Indoor Environmental Issues in Disaster Resilience," NIST Technical Note 1882, Jul. 2015, 40 pages.
"Precision Heat and Control Systems for Onshore Drilling and Production," Chromalox Precision Heat and Control, 2011, 6 pages.
"ZEUS Electric Pumping Unit," Halliburton, printed 2021, 4 pages.
Nayyar, "Piping Handbook—Seventh Edition," Piping Handbook, 1999, 77 pages.
"Wire Rope Isolator Technologies," ITT Enidine, Inc., Mar. 29, 2014, Enidine, 78 pages.
Gardner Denver, Well Servicing Pump, Model GD-2500Q, GD-2500Q-HD, Quintuplex Pumps, Super GWS Fluid End (Uni-Flange) Parts List, 310FWF997 Revision A, Sep. 2011, 45 pages.
Wachel et al., "Analysis of Vibration and Failure Problems in Reciprocating Triplex Pumps for Oil Pipelines," The American Society of Mechanical Engineers, 1985, 8 pages.
"Flowline Products and Services—World Proven Chiksan and Weco Equipment," FMC Technologies, Mar. 28, 2015, 31 pages (Part 1).
"Flowline Products and Services—World Proven Chiksan and Weco Equipment," FMC Technologies, Mar. 28, 2015, 49 pages (Part 2).
"A complete line of swivel joints for drilling, production, and well servicing," Chiksan Original Swivel Joints, Nov. 1996, 16 pages.
"Worlds Best Swivel Joints," FlowValve, Jan. 17, 2015, available at https://web.archive.org/web/20150117041757/ http://www.flowvalve.com/swivels, 10 pages.
"Victualic Couplings—Vibration Attenuation Characteristics," Victaulic Company, Oct. 2014, 5 pages.
Hudson et al., "Modeling Victaulic Couplings in Piping Stress Analysis Programs," Victaulic Company, WP-18 6685 Rev. B, Mar. 19, 2013, 19 pages.
"AGS Flexible Coupling Style W77," Victaulic, Apr. 23, 2015, available at: https://web.archive.org/web/20150423052817/http://www.victaulic.com/en/products-services/products/style-w77-ags-flexible-coupling/, 1 page.
"Advanced Groove System (AGS) Large Diameter Solutions." Victaulic, Apr. 19, 2015, available at: https://web.archive.org/web/20150419063052/http:/www.victaulic.com/en/businesses-solutions/solutions/advanced-groove-system/, 2 pages.
"Accommodating Seismic Movement," Victaulic, Apr. 12, 2015, available at https://web.archive.org/web/20150412042941/http:/www.victaulic.com/en/businesses-solutions/solutions/accommodating-seismic-movement/, 2 pages.
Saville, "The Victaulic Pipe Joint," Journal (American Water Works Association), Nov. 1922, vol. 9, No. 6, 8 pages.
Balaji et al., "Wire rope isolators for vibration isolation of equipment and structures," IP Conference Series: Materials Science and Engineering, 2015, 12 pages.
"FlowGuard Products," CoorsTek, Sep. 15, 2014 available at: https://web.archive.org/web/20140915230538/ http://coorstek.com/resource-library/library/8510-1747-FlowGuard-Pulsation-Dampers.pdf, 8 pages.
"FlowGuard Pulsation Dampeners," CoorsTek, Feb. 23, 2015, available at: https://web.archive.org/web/20150223101630/http://www.coorstek.com/markets/energy_equipment/oil-gas/flowguard.php, 2 pages.
Morton, "Unlocking the Earth: A Short History of Hydraulic Fracturing," GEO ExPro, vol. 10, No. 6, Dec. 2013, 5 pages.
"Welcome to STAUFF," STAUFF, Aug. 5, 2013, 1 page.
"STAUFF Clamps," STAUFF, Aug. 7, 2013, 3 pages.
"STAUFF Clamps, Heavy Series (DIN 3015-2)," STAUFF, Aug. 30, 2013, 1 page.
"Heavy Series (DIN 3015-2)", STAUFF, Product Literature, Nov. 3, 2013, 1 page.
"Heavy Series DIN 3015, Part 2," STAUFF, Nov. 5, 2013, 24 pages.
Harris et al., "Harris' Shock and Vibration Handbook—Fifth Edition," McGraw-Hill Handbooks, 2002 [excerpted], 22 pages.
"Mark's Standard Handbook for Mechanical Engineers, 11th Edition," McGraw-Hill, ISBN 0-07-142867-4, 2007 [excerpted], 1 page.
Mallik et al., "On the Modelling of Non-Linear Elastomeric Vibration Isolators," Journal of Sound and Vibration, 1999, 219(2), 15 pages.
Malcius, "Mathematical model evaluation and parameter identification of pipe holder element," Journal of Vibroengineering, Jun. 2013, vol. 15, Issue 2, ISSN 1392-8716, 9 pages.
Wachel et al., "Piping Vibration Analysis," Engineering Dynamics, Incorporated, Proceedings of the Nineteenth Turbomachinery Symposium, 1990, 16 pages.
Arvani et al., "Design and Development of an Engineering Drilling Simulator and Application for Offshore Drilling for MODUs and Deepwater Environments," Society of Petroleum Engineers, SPE-170301-MS, 2014, 17 pages.
Davis, "Natural Gas Finding Niche in E-Fracking, But Diesel Still Rules," Natural Gas Intelligence, NGI, 2019, 9 pages.
International Search Report and Written Opinion issued in PCT Application No. PCT/US2020/023912, dated Jun. 23, 2020.
Non-Final Office Action issued in corresponding U.S. Appl. No. 14/622,532, dated May 17, 2016.
Non-Final Office Action issued in corresponding U.S. Appl. No. 14/881,535, dated May 20, 2020.
Non-Final Office Action issued in corresponding U.S. Appl. No. 14/881,535, dated Oct. 6, 2017.
Non-Final Office Action issued in corresponding U.S. Appl. No. 14/884,363, dated Sep. 5, 2017.
Non-Final Office Action issued in corresponding U.S. Appl. No. 15/145,414, dated Nov. 29, 2017.
Non-Final Office Action issued in corresponding U.S. Appl. No. 15/145,491, dated May 15, 2017.
Non-Final Office Action issued in corresponding U.S. Appl. No. 15/145,491, dated Sep. 12, 2016.

(56) References Cited

OTHER PUBLICATIONS

Non-Final Office Action issued in corresponding U.S. Appl. No. 15/183,387, dated Apr. 2, 2018.
Canadian Office Action issued in Canadian Application No. 2,964,597, dated Jun. 20, 2019.
Non-Final Office Action issued in corresponding U.S. Appl. No. 15/217,040, dated Nov. 29, 2016.
Non-Final Office Action issued in corresponding U.S. Appl. No. 15/217,081, dated Oct. 4, 2018.
Non-Final Office Action issued in corresponding U.S. Appl. No. 15/235,716, dated May 29, 2018.
Non-Final Office Action issued in corresponding U.S. Appl. No. 15/235,788, dated Dec. 14, 2016.
Non-Final Office Action issued in corresponding U.S. Appl. No. 15/291,842, dated Jan. 6, 2017.
Non-Final Office Action issued in corresponding U.S. Appl. No. 15/293,681, dated Feb. 16, 2017.
Non-Final Office Action issued in corresponding U.S. Appl. No. 15/294,349, dated Apr. 10, 2018.
Canadian Office Action issued in Canadian Application No. 2,936,997, dated Oct. 1, 2019.
Canadian Office Action issued in Canadian Application No. 2,943,275, dated Mar. 1, 2019.
Canadian Office Action issued in Canadian Application No. 2,944,968, dated Aug. 17, 2020.
Canadian Office Action issued in Canadian Application No. 2,945,281, dated Sep. 28, 2018.
Kroposki et al., "Making Microgrids Work," 6 IEEE Power and Energy Mag. 40, 41, 2008.
Ton et al., "The U.S. Department of Energy's Microgrid Initiative," 25 The Electricity J. 84, 2012, pp. 84-94.
Non-Final Office Action issued in U.S. Appl. No. 16/871,328 mailed Dec. 9, 2021.
Non-Final Office Action issued in U.S. Appl. No. 16/943,935 mailed Oct. 21, 2021.
Non-Final Office Action issued in U.S. Appl. No. 16/564,186, mailed Oct. 15, 2021.
Final Office Action issued in U.S. Appl. No. 16/356,263 mailed Oct. 7, 2021.
Non-Final Office Action issued in U.S. Appl. No. 17/060,647 mailed Sep. 20, 2021.
Non-Final Office Action issued in U.S. Appl. No. 16/901,774 mailed Sep. 14, 2021.
Canadian Office Action issued in Canadian Application No. 3,094,768 mailed Oct. 28, 2021.
Shafto, "Growth in electric-fracking fleets stunted by tight producer budgets," S&P Global Market Intelligence, Aug. 6, 2019, 4 pages.
"Swivel Joint," Jereh, Yantal Jereh Petroleum Equipment & Technologies Co. Ltd., printed Dec. 1, 2022, 14 pages.
Camara, "Electrical Engineering Reference Manual for the Electrical and Computer PE Exam—Sixth Edition," Professional Publications, Inc., ISBN: 1-888577-56-8, 2002, 50 pages.
"Comprehensive Power, Power It Up," Technical Presentation, Feb. 27, 2013 (available at: https://www.slideshare.net/jeffsable/comprehensive-power-introduction-oct2013?from_action=save), 28 pages.
"Comprehensive Power, Power It Up," Technical Presentation, Oct. 3, 2013 (available at: https://www.slideshare.net/jeffsable/comprehensive-power-introduction-oct2013?from_action=save), 26 pages.
"American National Standard—Motors and Generators," ANSI/NEMA MG 1, 2011, 636 pages.
"IEEE Standard for Petroleum and Chemical Industry—Premium-Efficiency, Severe-Duty, Totally Enclosed Fan-Cooled (TEFC) Squirrel Cage Induction Motors—Up to and Including 370 KW (500 hp)," IEEE, 2009, 32 pages.
Cary et al., "Electric Rotating Machine Standards Part II: Magnetic Wedge Design & Monitoring Methods," IEEE, Paper No. PCIC-2011-41, 2011, 8 pages.
Bogh et al., "A User's Guide to Factory Testing of Large Motors: What Should Your Witness Expect?," IEEE, Paper No. PCIC-, 2009, 8 pages.
Lockley et al., "What Do the API Motor/Generator Features Cost and What Do They Buy You?," IEEE, Paper No. PCIC-2010-22, 2010, 10 pages.
Malinowski et al., "Petrochemical standards a comparison between IEEE 841-2001, API 541 and API 547," IEEE, Paper No. PCIC-2004-22, 2004, 8 pages.
"Reinventing the Frac Fleet," Clean Fleet, WhisperFrac Reducing Noise and Vibrations, 2018, 2 pages.
"MEC's Mobile Electric Centers for Voltages up to 36kV," ABB, printed 2021, 2 pages.
"Prefabricated Electric Centers (PEC)—Mobile Electric Centers (MEC)," ABB, 2017, 14 pages.
"Mobile Substations on wheels," ABB, 2022, 4 pages.
"Benefits of Using Mobile Transformers and Mobile Substations for Rapidly Restoring Electrical Service," U.S. Department of Energy, Aug. 2006, 48 pages.
"The Evolution of the Modern Substation," Primera, 2022, 4 pages.
Hanna et al., "Medium-Voltage Adjustable-Speed Drives—Users' and Manufacturers' Experiences," IEEE Transactions on Industry Applications, vol. 33, No. 6, Nov./Dec. 1997, 9 pages.
"IEEE 100: The Authoritative Dictionary of IEEE Standards Terms, Seventh Edition," IEEE Press, 2000, ISBN: 0-7381-2601-2, 7 pages.
"Adjustable Speed Electrical Power Drive Systems—Part 4: General Requirements—Rating Specifications for A.C. Power Drive Systems Above 1000 V A.C. and Not Exceeding 35 KV," National Electrical Manufacturers Association (NEMA) Standards Publication ICS 61800-4, 2004, 139 pages.
Roe, "Practices and Procedures of Industrial Electrical Design," McGraw-Hill, 1972, ISBN: 0-07-053390-3, 17 pages.
Oehring et al., U.S. Appl. No. 62/242,173, 2015, 17 pages.
Samsung All-In-One Security System, Quick Start Guide Kit Model SDHC5100, printed 2022, 11 pages.
Amazon.com listing for Samsung SDH-C5100 16 Channel 720p HD DVR Video Security System, 2015, 2 pages.
Amazon.com listing for Amcrest ProHD Wireless IP Security Camera, 2015, 8 pages.
Amazon.com listing for Security & Surveillance Cameras, 2015, 6 pages.
Stewart, "Extracting the Digit! Time for an ROV Electronics Shake-Up?," Kongsberg Simrad Ltd, UTI, 1997, 10 pages.
Martin et al., "Lessons Learned from 27 Years' Experience of Stimulation Vessel Design and Operation—a Case Study," SPE 166243, 2013, 12 pages.
Maddox, "Visualizing Production in Flowing Oil Wells," Halliburton Energy Services, SPWLA 37th Annual Logging Symposium, Jun. 16-19, 1996, 6 pages.
Cooper et al., "The First Purpose-Built Stimulation Vessel for North Sea Application," Dowell Schlumberger, Society of Petroleum Engineers of AIME, SPE 12993, 1984, 7 pages.
Talley, "Development of a Closed Circuit TV Borehole Probe," Design Engineering Laboratories, Inc., Contract H0308041, Sep. 1984, 22 pages.
Smith et al., "Fracture Width-Design vs. Measurement," Amoco Production Co., Society of Petroleum Engineers of AIME, SPE 10965, 1982, 9 pages.
Hurst et al., "Development and Application of 'Frac' Treatments in the Permian Basin," SPE 405-G, vol. 204, 1955, 8 pages.
Briggs, "Development of a Downhole Television Camera," Oceanographic Engineering Corporation, 1964, 1 page.
IPIECA About Us page, 2015, 1 page.
Appl et al., "A Viewing Lens for High Pressure Applications," Society of Petroleum Engineers of AIME, SPE-299, 1962, 7 pages.
Taylor, "Efficiency: Watchword of the Oil Industry," Financial Analysts Journal, 2018, 4 pages.
Pritchard, "U.S. Color Television Fundamentals: A Review," SMPTE Journal, Nov. 1977, vol. 86, 10 pages.
Moxastore website, listing for NPORTIA5250, 2015, 2 pages.
Moxastore website, About Us, 2015, 1 page.
Moxastore website, Homepage, 2015, 2 pages.

(56) References Cited

OTHER PUBLICATIONS

Moxastore website, listing for Moxa 802.11 Ethernet to Serial, 2016, 1 page.
Amazon.com listing for Global Cache iTach, IP to Serial with PoE (IP2SL-P) by Global Cach, 2014, 3 pages.
Amazon.com listing for SainSmart TCP/IP Ethernet to Serial RS232 RS485 Intelligent Communication Converter by SainSmart, 2014, 4 pages.
Amazon.com listing for TCP/IP Ethernet to Serial RS232 RS485 RS422 Converter by Atc, 2014, 2 pages.
Amazon.com listing for StarTech.com 1 Port RS232 Serial to IP Ethernet Converter (NETRS2321P) by StarTech, 2014, 4 pages.
Amazon.com listing for StarTech NETRS2321E 1 Port RS-232/422/485 Serial over IP Ethernet Device Server by StarTech, 2014, 4 pages.
OSHA-NIOSH Hazard Alert: Worker Exposure to Silica during Hydraulic Fracturing, U.S. Department of Labor, 2012, 15 pages.
Avallone et al., "Marks Standard Handbook for Mechanical Engineers 11th Edition," McGraw-Hill, 2007, 5 pages.
Fink, "Standard Handbook for Electrical Engineers," Thirteenth Edition, McGraw-Hill, ISBN: 0-07-020984-7, 7 pages (excerpts) (Part 1).
Fink, "Standard Handbook for Electrical Engineers," Thirteenth Edition, McGraw-Hill, ISBN: 0-07-020984-7, 7 pages (excerpts) (Part 2).
Fink, "Standard Handbook for Electrical Engineers," Thirteenth Edition, McGraw-Hill, ISBN: 0-07-020984-7, 6 pages (excerpts) (Part 3).
Roe, "Practices and Procedures of Industrial Electrical Design," McGraw-Hill, 1972, ISBN: 0-07-053390-3, 14 pages (Part 1).
Roe, "Practices and Procedures of Industrial Electrical Design," McGraw-Hill, 1972, ISBN: 0-07-053390-3, 11 pages (Part 2).
Camara, "Electrical Engineering Reference Manual for the Electrical and Computer PE Exam—Sixth Edition," Professional Publications, Inc., ISBN: 1-888577-56-8, 2002, 17 pages (Part 1).
Camara, "Electrical Engineering Reference Manual for the Electrical and Computer PE Exam—Sixth Edition," Professional Publications, Inc., ISBN: 1-888577-56-8, 2002, 25 pages (Part 2).
Camara, "Electrical Engineering Reference Manual for the Electrical and Computer PE Exam—Sixth Edition," Professional Publications, Inc., ISBN: 1-888577-56-8, 2002, 20 pages (Part 3).
Camara, "Electrical Engineering Reference Manual for the Electrical and Computer PE Exam—Sixth Edition," Professional Publications, Inc., ISBN: 1-888577-56-8, 2002, 19 pages (Part 4).
Camara, "Electrical Engineering Reference Manual for the Electrical and Computer PE Exam—Sixth Edition," Professional Publications, Inc., ISBN: 1-888577-56-8, 2002, 21 pages (Part 5).
PPI Course Catalog, 2004, available at: https://web.archive.org/web/20040220012405/http://ppi2pass.com/catalog/servlet/MyPpi_fl_corner-catalog.pdf, 16 pages.
"Teaching an Electrical and Computer Engineering PE Exam Review Course," PPI, 2003, available at: https://web.archive.org/web/20031223100101/http://ppi2pass.com/catalog/servlet/MyPpi_pg_corner-teachee.html, 2 pages.
"Instructors Corner," PPI, 2003, available at: https://web.archive.org/web/20031219232547/http://ppi2pass.com/catalog/servlet/MyPpi_pg_corner-corner.html, 2 pages.
EE-Reference Online Index, 2004, available at: https://web.archive.org/web/20040731020344/http://ppi2pass.com/catalog/servlet/MyPpi_fl_indices-EERMindex.pdf, 41 pages.
EE-Reference Online Introduction, 2004, available at: https://web.archive.org/web/20041013101643/http://ppi2pass.com/catalog/servlet/MyPpi_fl_indices-EERMIntro.pdf, 12 pages.
"Electrical PE Exam Review Products," PPI Online Catalog, 2004, available at: https://web.archive.org/web/20040214233851/http://ppi2pass.com/catalog/servlet/MyPpi_ct_ELECTRICAL, 7 pages.
"The PPI Online Catalog," 2004, available at: https://web.archive.org/web/20040215142016/http://ppi2pass.com/catalog/servlet/MyPpi_ct_MAIN, 2 pages.
Homepage of Professional Publications, Inc., 2004, available at: https://web.archive.org/web/20040209054901/http:/ppi2pass.com/catalog/servlet/MyPpi, 1 page.
"What PPI Customers Say," 2003), available at: https://web.archive.org/web/20031226130924/http://ppi2pass.com/catalog/servlet/MyPpi_pg_comments-EEcomments.html, 2 pages.
"About PPI," 2003, available at: https://web.archive.org/web/20031219231426/http://ppi2pass.com:80/catalog/servlet/MyPpi_pg_aboutppi.html, 1 page.
Amazon.com listing of EE-Reference, 2007, available at: https://web.archive.org/web/20070103124447/https://www.amazon.com/Electrical-Engineering-Reference-Manual-Computer/dp/1888577568/, 7 pages.
Hampton, "Low-cost fracking offers boon to oil producers, headaches for suppliers," Reuters, Sep. 12, 2019, https://www.reuters.com/article/us-usa-oil-electric-fracturing-focus/low-cost-fracking-offers-boon-to-oil-producers-headaches-for-supplies, 11 page.
"All Electric Fracturing—Reducing Emissions and Cost," 2021, H013770, 6 pages.
Abbott et al., "Crippling the Innovation Economy: Regulatory Overreach at the Patent Office," Regulatory Transparency Project of the Federalist Society, Aug. 14, 2017, 35 pages.
"Hydraulic Fracturing Techbook," Hartenergy, 2015, 9 pages.
"Petroleum Alumnus and Team Development Mobile Fracturing Unit that Alleviates Environmental Impact," LSU College of Engineering, 2021, 2 pages.
"Clean Fleet Reduces Emissions by 99% at Hydraulic Fracturing Sites," FluidPower Journal, 2019, 5 pages.
Deuster, "Game-changing hydraulic fracturing technology, reduces emissions by 99%," Intrado GlobeNewswire, Oct. 1, 2014, 4 pages.
"Halliburton Delivers Successful Grid-Powered Frac Operation", Halliburton News Release, Jan. 14, 2021, 4 pages.
Wang et al., "Development in the Limited—Entry Completion Fracturing Technique," SPE 17834, 1988, 13 pages.
Holden III et al., "Successful Stimulation of Fordoche Field With a Retarded HF Acid," Society of Petroleum Engineers of AIME, Aug. 1981, 6 pages.
Milligan, "Sour Gas Well Completion Practices in the Foothills," Society of Petroleum Engineers of AIME, Sep. 1982, 12 pages.
Beck et al., "Reservoir Evaluation of Fractured Cretaceous Carbonates in South Texas," SPWLA Eighteenth Annual Logging Symposium, Jun. 5-8, 1977, 25 pages.
Webster, "Current Completion Practices in Tight Reservoirs," Society of Petroleum Engineers, SPE 6379, 1977, 8 pages.
Bielstein, "Wire-Line Methods and Equipment," Humble Oil and Refining Company, Apr. 2, 1967, 16 pages.
"Form-wound Squirrel-Cage Induction Motors—500 Horsepower and Larger," ANSI/API Standard, 541-2003, Fourth Edition, Jun. 2004, 88 pages.
Gardner Denver, "Well Servicing Pump, Model GD-2500Q, Quintuplex, Operating and Service Manual," 300FWF996 Revision C, Aug. 2005, 46 pages.
"Standard Specification for Steel Bars, Carbon and Alloy, Hot-Wrought, General Requirements for," ASTM Int;I, A 29/A29M-05, 2005, 16 pages.
"Variable Speed Pumping: A Guide to Successful Applications," Elsevier 2004, ISBN 1-85617-449-2, 2004, 186 pages.
Bonnett et al., "Squirrel Cage Rotor Options for A.C. Induction Motors," IEEE, 2000, 14 pages.
Bonnett, "Root Cause Failure Analysis for AC Induction Motors in the Petroleum and Chemical Industry," IEEE, Paper No. PCIC-2010-43, 2010, 13 pages.
"Mark's Standard Handbook for Mechanical Engineers, 11th Edition," McGraw-Hill, ISBN 0-07-142867-4, 2006, 11 pages.
"Standard Handbook for Electrical Engineers," Thirteenth Edition, McGraw-Hill, ISBN 0-07-020984-7, 1993, 9 pages (Part 1).
"Standard Handbook for Electrical Engineers," Thirteenth Edition, McGraw-Hill, ISBN 0-07-020984-7, 1993, 7 pages (Part 2).
"Standard Handbook for Electrical Engineers," Thirteenth Edition, McGraw-Hill, ISBN 0-07-020984-7, 1993, 6 pages (Part 3).
"112 IEEE Standard Test Procedure for Polyphase Induction Motors and Generators," IEEE Power Engineering Society, IEEE Std 112, 2004, 42 pages (Part 1).

(56) References Cited

OTHER PUBLICATIONS

"112 IEEE Standard Test Procedure for Polyphase Induction Motors and Generators," IEEE Power Engineering Society, IEEE Std 112, 2004, 45 pages (Part 2).

Hodowanec et al., "Introduction to API Standard 541, 4th Edition—Form-Wound Squirrel Cage Induction Motors—Larger than 500 Horsepower," IEEE, Paper No. PCIC-2003-33, 2003, 9 pages.

Rahill et al., "Sorting Out the Overlap," IEEE Industry Applications Magazine, vol. 15, No. 1, Jan.-Feb. 2009, 12 pages.

"Manufacturers of Cushioned Clamping, Quick Coupling & Support Systems," ZSI Beta Clamps, ZSI, Inc., Apr. 29, 2015, 2 pages.

Meikrantz et al., "Advances in Liquid/Liquid Centrifuge Design Provide New Options for Petroleum Production," Society of Petroleum Engineers, SPE 56709, 1999, 4 pages.

"Process Burner" (https://www.cebasrt.com/productsloii-gaslprocess-bumer) 06 Sep. 6, 2018 (Sep. 6, 2018), entire document, especially para (Burners for refinery Heaters].

Notice of Allowance issued in corresponding U.S. Appl. No. 16/570,331, dated Jan. 9, 2020.

Notice of Allowance issued in corresponding U.S. Appl. No. 14/622,532, dated Mar. 27, 2017.

Non-Final Office Action issued in corresponding U.S. Appl. No. 15/356,436, dated Aug. 19, 2019.

Non-Final Office Action issued in corresponding U.S. Appl. No. 15/486,970, dated Jun. 22, 2017.

Non-Final Office Action issued in corresponding U.S. Appl. No. 15/487,656, dated Jun. 23, 2017.

Notice of Allowance issued in corresponding U.S. Appl. No. 15/217,040, dated Mar. 28, 2017.

Notice of Allowance issued in corresponding U.S. Appl. No. 15/635,028, dated Apr. 23, 2019.

International Search Report and Written Opinion issued in PCT Application No. PCT/US2018/063970, dated Mar. 5, 2019.

Non-Final Office Action issued in corresponding U.S. Appl. No. 15/487,694, dated Jun. 26, 2017.

Non-Final Office Action issued in corresponding U.S. Appl. No. 15/644,487, dated Jul. 25, 2018.

Non-Final Office Action issued in corresponding U.S. Appl. No. 15/644,487, dated Nov. 13, 2017.

Non-Final Office Action issued in corresponding U.S. Appl. No. 15/994,772, dated Sep. 3, 2019.

Non-Final Office Action issued in corresponding U.S. Appl. No. 16/152,695, dated Mar. 3, 2020.

Non-Final Office Action issued in corresponding U.S. Appl. No. 16/152,732, dated Oct. 2, 2019.

Non-Final Office Action issued in corresponding U.S. Appl. No. 16/160,708, dated Dec. 12, 2018.

UK Power Networks—Transformers to Supply Heat to Tate Modern—from Press Releases May 16, 2013.

Non-Final Office Action issued in corresponding U.S. Appl. No. 16/170,695, dated Feb. 12, 2019.

Non-Final Office Action issued in corresponding U.S. Appl. No. 16/170,695, dated Jun. 7, 2019.

Non-Final Office Action issued in corresponding U.S. Appl. No. 16/210,749, dated Feb. 25, 2019.

Non-Final Office Action issued in corresponding U.S. Appl. No. 16/268,030, dated Jun. 7, 2019.

Non-Final Office Action issued in corresponding U.S. Appl. No. 16/268,030, dated May 10, 2019.

Non-Final Office Action issued in corresponding U.S. Appl. No. 16/268,030, dated Sep. 11, 2019.

Non-Final Office Action issued in corresponding U.S. Appl. No. 16/385,070, dated Aug. 4, 2020.

Non-Final Office Action issued in corresponding U.S. Appl. No. 16/385,070, dated Oct. 11, 2019.

International Search Report and Written Opinion issued in PCT Application No. PCT/US2019/037493, dated Sep. 11, 2019.

Non-Final Office Action issued in corresponding U.S. Appl. No. 16/443,273, dated Sep. 20, 2019.

Non-Final Office Action issued in corresponding U.S. Appl. No. 16/564,186, dated Dec. 6, 2019.

Non-Final Office Action issued in corresponding U.S. Appl. No. 16/597,008, dated Dec. 23, 2019.

Final Office Action issued in corresponding U.S. Appl. No. 16/210,749, dated Jun. 11, 2019.

Final Office Action issued in corresponding U.S. Appl. No. 15/294,349, dated Jul. 6, 2017.

International Search Report and Written Opinion issued in PCT Application No. PCT/US2018/063977, dated Feb. 15, 2019.

Final Office Action issued in corresponding U.S. Appl. No. 15/145,491, dated Jan. 20, 2017.

Final Office Action issued in corresponding U.S. Appl. No. 14/622,532, dated Dec. 7, 2016.

Final Office Action issued in corresponding U.S. Appl. No. 14/622,532, dated Dec. 21, 2015.

Non-Final Office Action issued in corresponding U.S. Appl. No. 16/597,014, dated Jan. 10, 2020.

International Search Report and Written Opinion issued in PCT Application No. PCT/US2019/055325, dated Jan. 2, 2020.

International Search Report and Written Opinion issued in PCT Application No. PCT/US2019/055323, dated Feb. 11, 2020.

International Search Report and Written Opinion issued in PCT Application No. PCT/US2019/051018, dated Nov. 26, 2019.

Non-Final Office Action issued in corresponding U.S. Appl. No. 15/145,443, dated Feb. 7, 2017.

International Search Report and Written Opinion issued in PCT Application No. PCT/US2019/027584, dated Jul. 9, 2019.

International Search Report and Written Opinion issued in PCT Application No. PCT/US2019/016635, dated Apr. 10, 2019.

International Search Report and Written Opinion issued in PCT Application No. PCT/US2018/040683, dated Sep. 19, 2018.

International Search Report and Written Opinion issued in PCT Application No. PCT/US2018/054542, dated Jan. 2, 2019.

International Search Report and Written Opinion issued in PCT Application No. PCT/US2018/054548, dated Jan. 2, 2019.

International Search Report and Written Opinion issued in PCT Application No. PCT/US2018/055913, dated Dec. 31, 2018.

International Search Report and Written Opinion issued in PCT Application No. PCT/US2018/057539, dated Jan. 4, 2019.

SYSTEM AND METHOD FOR INTEGRATED FLOW SUPPLY LINE

CROSS REFERENCE TO RELATED APPLICATION

This application is a continuation of U.S. patent application Ser. No. 17/321,936 filed May 17, 2021, titled SYSTEM AND METHOD FOR INTEGRATED FLOW SUPPLY LINE, now U.S. Pat. No. 11,668,420 issued Jun. 6, 2023, which is a continuation of U.S. patent application Ser. No. 16/728,359 filed Dec. 27, 2019, titled SYSTEM AND METHOD FOR INTEGRATED FLOW SUPPLY LINE, now U.S. Pat. No. 11,009,162 issued May 18, 2021, the entire disclosures of which are incorporated herein by reference for all intents and purposes.

BACKGROUND

1. Technical Field

This disclosure relates generally to hydraulic fracturing and more particularly to systems and methods for fluid supply lines utilized in hydraulic fracturing.

2. Background

With advancements in technology over the past few decades, the ability to reach unconventional sources of hydrocarbons has tremendously increased. Horizontal drilling and hydraulic fracturing are two such ways that new developments in technology have led to hydrocarbon production from previously unreachable shale formations. Hydraulic fracturing (fracturing) operations typically require powering numerous components in order to recover oil and gas resources from the ground. For example, hydraulic fracturing usually includes pumps that inject fracturing fluid down the wellbore, blenders that mix proppant into the fluid, cranes, wireline units, and many other components that all must perform different functions to carry out fracturing operations.

Hydraulic fracturing operations often try to increase flow rates through fracturing pumps in order to reduce operational times and save costs. However, typical fracturing systems have established component sizes and non-standard components are challenging to incorporate and may lead to errors, as operators may be unfamiliar with the new components. One such instance is in fluid flow lines (e.g., hoses) utilize to supply fracturing fluid to the pumps. Many flow lines utilized in the industry have a 4 inch diameter. However, this flow diameter limits fluid inlet into the pumps, which may be undesirable, because pumps operating at lower flow rates and/or pressures than desired may experience premature wear and failures. Moreover, merely increasing hose sizes is not practical because of component fittings on the pump and potential problems with flow rates, as flow rates that drop below a threshold may experience drop out of particulates, leading to blockages and other problems at the well site.

SUMMARY

Applicant recognized the problems noted above herein and conceived and developed embodiments of systems and methods, according to the present disclosure, for operating electric fracturing pumps.

In an embodiment, a hydraulic fracturing system for fracturing a subterranean formation includes an electric powered, multi-plunger pump having an inlet and an outlet, the outlet coupled to a well associated with the subterranean formation and powered by at least one electric motor, the electric powered pump configured to pump fluid into a wellbore associated with the well at a high pressure so that the fluid passes from the wellbore into the subterranean formation and fractures the subterranean formation. The system also includes a fluid source, coupled to the inlet of the electric powered pump, the fluid source providing a slurry for injection into the subterranean formation. The system further includes a hose extending between the fluid source and the electric powered pump, the hose being flexible and having a first diameter. The system includes a fitting between the hose and the electric powered pump, the fitting having a first end for receiving the hose at the first diameter and a second end for coupling to the electric powered pump at a second diameter, the second diameter being larger than the first diameter. The system also includes a distribution system, positioned between the wellbore and the electric powered pump, the distribution system collecting the slurry from electric powered pumps for injection into the subterranean formation.

In an embodiment, a hydraulic fracturing system for fracturing a subterranean formation includes an electric powered, multi-plunger pump having an inlet and an outlet, the outlet coupled to a well associated with the subterranean formation and powered by at least one electric motor, the electric powered pump configured to pump fluid into a wellbore associated with the well at a high pressure so that the fluid passes from the wellbore into the subterranean formation and fractures the subterranean formation. The system also includes a fluid source, coupled to the inlet of the electric powered pump, the fluid source providing a slurry for injection into the subterranean formation. The system includes a hose extending between the fluid source and the electric powered pump, the hose including a first end, for coupling to the fluid source, having a first diameter, a second end, for coupling to the inlet of the electric powered pump, having a second diameter, and a body between the first end and the second end having a third diameter, the third diameter being less than both the first diameter and the second diameter. The system further includes a pair of fittings, a first fitting forming the first end and a second fitting forming the second end, each fitting of the pair of fittings having a shank end for receiving at least a portion of the body and a union for engaging the respective fluid source and electric powered pump.

In an embodiment, a method for selecting a hose diameter for a flow line utilized in fracturing operations includes determining a first end connection size is a first diameter. The method also includes determining a second end connection size is a second diameter. The method further includes determining a first flow rate, associated with a first hose diameter, is below a threshold. The method includes determining a second flow rate, associated with a second hose diameter, exceeds the threshold. The method also includes forming the flow line using the second hose diameter.

BRIEF DESCRIPTION OF DRAWINGS

Some of the features and benefits of the present disclosure having been stated, others will become apparent as the description proceeds when taken in conjunction with the accompanying drawings, in which.

Figure 1:
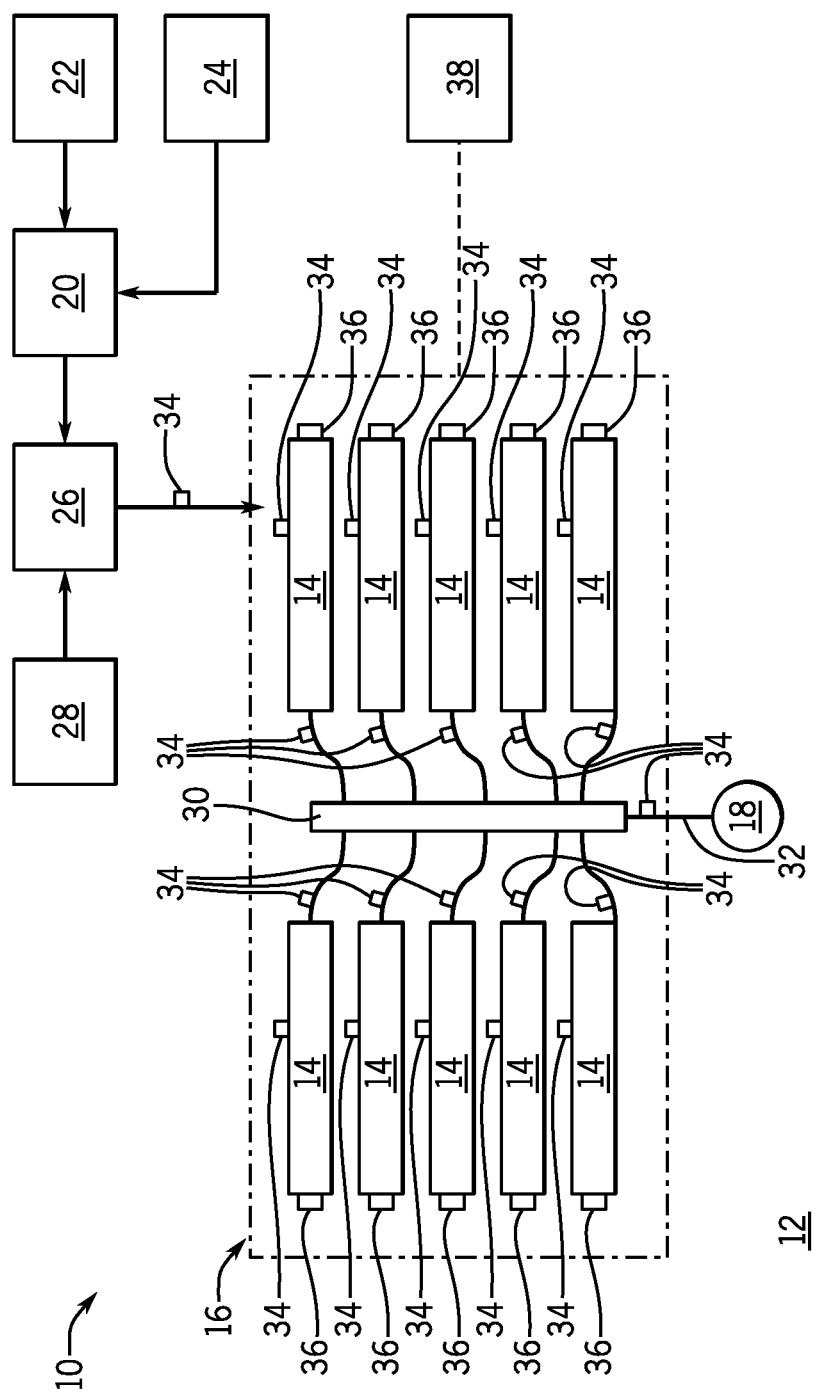
FIG. 1 is a schematic plan view of an embodiment of a fracturing operation, in accordance with embodiments of the present disclosure.

While the disclosure will be described in connection with the preferred embodiments, it will be understood that it is not intended to limit the disclosure to that embodiment. On the contrary, it is intended to cover all alternatives, modifications, and equivalents, as may be included within the spirit and scope of the disclosure as defined by the appended claims.

DETAILED DESCRIPTION

The method and system of the present disclosure will now be described more fully hereinafter with reference to the accompanying drawings in which embodiments are shown. The method and system of the present disclosure may be in many different forms and should not be construed as limited to the illustrated embodiments set forth herein; rather, these embodiments are provided so that this disclosure will be thorough and complete, and will fully convey its scope to those skilled in the art. Like numbers refer to like elements throughout. In an embodiment, usage of the term "about" includes +/−5% of the cited magnitude. In an embodiment, usage of the term "substantially" includes +/−5% of the cited magnitude.

It is to be further understood that the scope of the present disclosure is not limited to the exact details of construction, operation, exact materials, or embodiments shown and described, as modifications and equivalents will be apparent to one skilled in the art. In the drawings and specification, there have been disclosed illustrative embodiments and, although specific terms are employed, they are used in a generic and descriptive sense only and not for the purpose of limitation.

When introducing elements of various embodiments of the present disclosure, the articles "a", "an", "the", and "said" are intended to mean that there are one or more of the elements. The terms "comprising", "including", and "having" are intended to be inclusive and mean that there may be additional elements other than the listed elements. Any examples of operating parameters and/or environmental conditions are not exclusive of other parameters/conditions of the disclosed embodiments. Additionally, it should be understood that references to "one embodiment", "an embodiment", "certain embodiments", or "other embodiments" of the present disclosure are not intended to be interpreted as excluding the existence of additional embodiments that also incorporate the recited features. Furthermore, reference to terms such as "above", "below", "upper", "lower", "side", "front", "back", or other terms regarding orientation or direction are made with reference to the illustrated embodiments and are not intended to be limiting or exclude other orientations or directions. Additionally, recitations of steps of a method should be understood as being capable of being performed in any order unless specifically stated otherwise. Furthermore, the steps may be performed in series or in parallel unless specifically stated otherwise. Particular dimensions may be referred to herein along with their accompanying abbreviations, including but not limited to: inches (in, "), meters (m), centimeters (cm), pounds per square inch (PSI), pascals (Pa), feet per second (ft/s), barrels per minute (BPM), and the like.

Embodiments of the present disclosure include specialty-sized hoses developed in order to allow greater flow/supply to frac pumps (e.g., positive displacement, multi plunger pumps). This increased flow capability reduces cavitation events and prolongs equipment life. Specially selecting a 5" (0.127 m) diameter hose allows for fluid velocity to be maintained above a threshold at which sand particles would begin to fall out and eventually cause a blockage (sand off) the hose itself. In order to utilize this diameter/size hose in a large-scale function, a connection point was developed to enable use of standard 6" (0.1524 m) components, such as but not limited to hammer unions, butterfly valves, and other 6" steel pipe components. Embodiments include a hybrid of 5" hose and 6" end connectors. This then results in an improvement to existing methods of supplying fluid to a positive displacement pump.

Embodiments of the present disclosure present an improvement over existing systems by removing the standard 4" (0.1016 m) supply hoses while maintaining standard 6" connection types by utilizing a particularly designed ferrule. The standard 4" supply hose provides an insufficient volume of fracturing fluid to a pump utilizing in hydraulic fracturing operation. These problems may be compounded when 4" connections are also used. Using a 5" diameter hose supplies more volume, reduces pressure drop, and reduces cavitation and other poor conditions pumps can experience when not supplied adequately.

FIG. 1 is a plan schematic view of an embodiment of a hydraulic fracturing system 10 positioned at a well site 12. In the illustrated embodiment, pump units 14, which make up a pumping system 16, are used to pressurize a slurry solution for injection into a wellhead 18. An optional hydration unit 20 receives fluid from a fluid source 22 via a line, such as a tubular, and also receives additives from an additive source 24. In an embodiment, the fluid is water and the additives are mixed together and transferred to a blender unit 26 where proppant from a proppant source 28 may be added to form the slurry solution (e.g., fracturing slurry) which is transferred to the pumping system 16. The pump units 14 may receive the slurry solution at a first pressure (e.g., 80 psi to 160 psi) and boost the pressure to around 15,000 psi for injection into the wellhead 18. In certain embodiments, the pump units 14 are powered by electric motors.

After being discharged from the pump system 16, a distribution system 30, such as a missile, receives the slurry solution for injection into the wellhead 18. The distribution system 30 consolidates the slurry solution from each of the pump units 14 and includes discharge piping 32 coupled to the wellhead 18. In this manner, pressurized solution for hydraulic fracturing may be injected into the wellhead 18.

In the illustrated embodiment, one or more sensors 34, 36 are arranged throughout the hydraulic fracturing system 10 to measure various properties related to fluid flow, vibration, and the like.

It should be appreciated that while various embodiments of the present disclosure may describe electric motors powering the pump units 14, in embodiments, electrical generation can be supplied by various different options, as well as hybrid options. Hybrid options may include two or more of the following electric generation options: Gas turbine generators with fuel supplied by field gas, CNG, and/or LNG, diesel turbine generators, diesel engine generators, natural gas engine generators, batteries, electrical grids, and the like. Moreover, these electric sources may include a single source type unit or multiple units. For example, there may be one gas turbine generator, two gas turbines generators, two gas turbine generators coupled with one diesel engine generator, and various other configurations.

In various embodiments, equipment at the well site may utilize 3-phase, 60 Hz, 690V electrical power. However, it should be appreciated that in other embodiments different power specifications may be utilized, such as 4160V or at different frequencies, such as 50 Hz. Accordingly, discussions herein with a particular type of power specification should not be interpreted as limited only the particularly discussed specification unless otherwise explicitly stated. Furthermore, systems described herein are designed for use in outdoor, oilfield conditions with fluctuations in temperature and weather, such as intense sunlight, wind, rain, snow, dust, and the like. In embodiments, the components are designed in accordance with various industry standards, such as NEMA, ANSI, and NFPA.

Figure 2A:
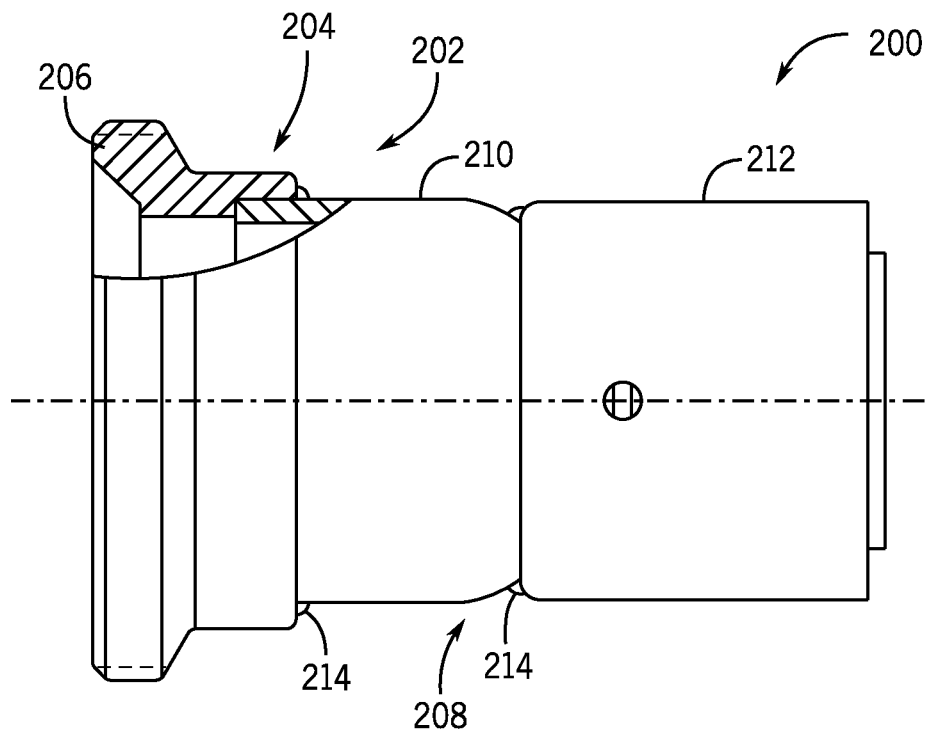
FIGS. 2A and 2B are side views of an embodiment of a fitting, in accordance with embodiments of the present disclosure.

FIG. 2A is a side view of an embodiment of a fitting 200 (e.g., ferrule) that may be utilized with embodiments of the present disclosure to incorporate 5" hoses into systems using 4" hoses and 6" fittings. In the illustrated embodiment, the fitting 200 includes a cutaway region 202 illustrating a coupling location 204 between a union 206 and a stem assembly 208. In the illustrated embodiment, the union 206 is configured to couple to a 6" coupling, for example on a pump. However, as illustrated, the stem assembly 208 includes a reducer 210 and a shank end 212 to receive a 5" hose (not pictured). For example, an end of the hose may be inserted into the shank end 212 and crimped, thereby joining the hose to the fitting 200. As a result, 5" hoses may be utilized in embodiments that include 6" fittings without significantly overhauling and/or modifying existing equipment. As discussed herein, 5" hoses provide numerous advantages including reduced pressure drop, greater capacity, and flow velocities greater than a threshold level corresponding to particulate drop out.

In the illustrated embodiment, various rigid couplings 214 are included along the fitting 200, for example, as welds utilizing to secure one or more components together. For example, there is a rigid coupling 214 between the union 206 and the reducer 210, as well as a rigid coupling 214 between the reducer 210 and the shank end 214. Accordingly, the components forming the fitting 200 may be particularly selected, based on one or more properties, for use with fracturing operations. For example, different fittings 200 may include different components. By way of example only, the union 206 may be replaced with a flanged end connection or the like.

Embodiments of the present disclosure that utilize the fitting 200 provide improved operations at a well site at least because greater volumes of fluid may be provided to fracturing pumps while maintaining flow rates above a threshold amount where particulates begin to drop out of the flow. For example, a 5" hose may meet rate demands while maintaining flow velocities at sufficient levels to reduce the likelihood of drop out. In contrast, a 4" hose may not meet rate demands and a 6" hose may not maintain flow velocities above the threshold for drop out. Moreover, the fitting 200 provides easy integration into existing systems without overhauling expensive equipment. For example, it may be costly to overhaul inlet piping on a fracturing pump, so much so, that it may be cost prohibitive to do so. Additionally, existing field equipment may be configured with certain specifications and include sunk costs, leading producers and operators to be reluctant to change. However, utilizing the fitting 200 enables existing equipment to remain in operation while providing improved operations.

Figure 2B:
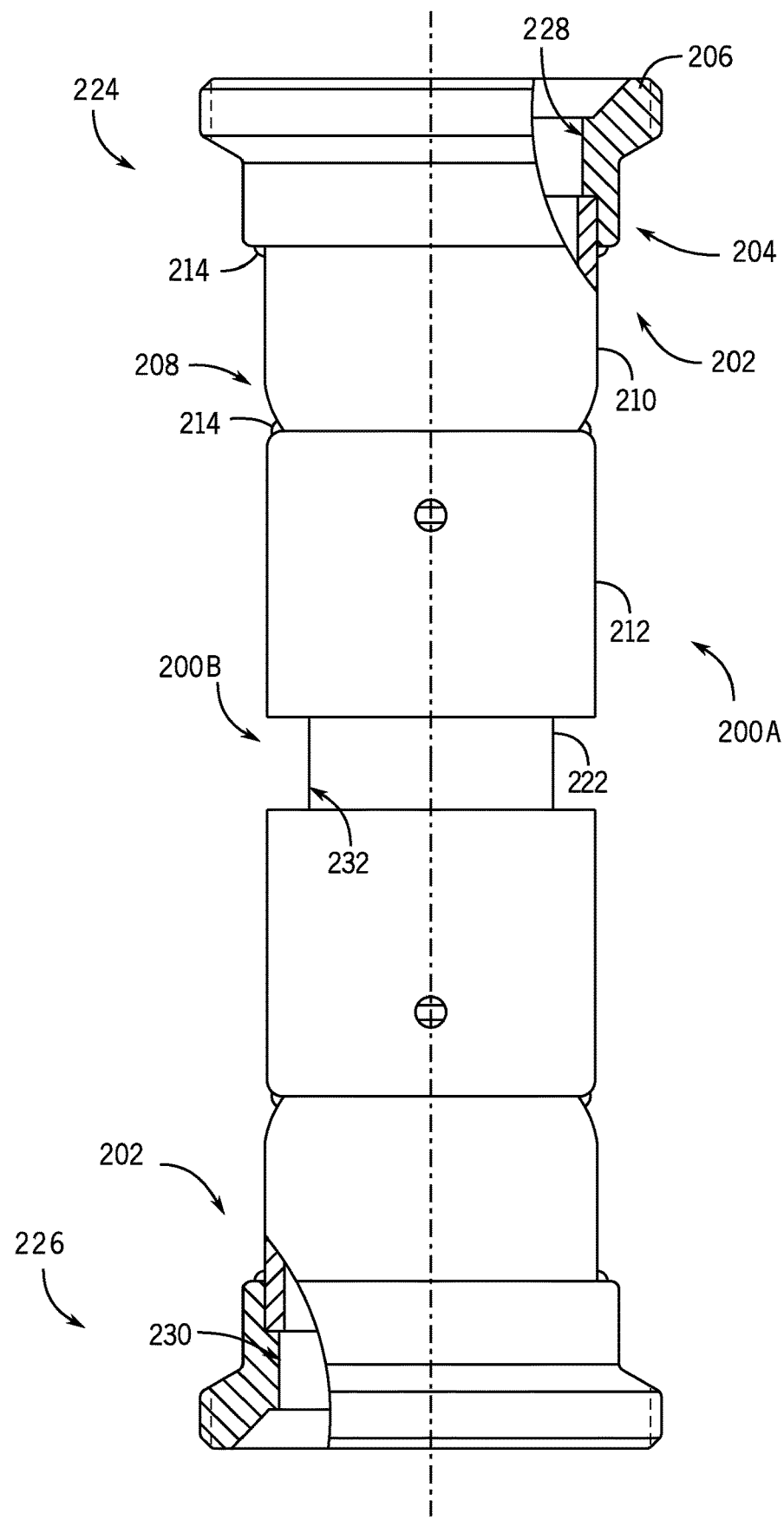

FIG. 2B is a side view of an embodiment of a hose assembly 220 (e.g., hose) that may incorporate one or more features of FIGS. 1 and 2A. By way of example, the hose assembly 220 may form at least a portion of a flow line, such as a flow line between a source and a pump, a pump and a manifold, or the like. This example illustrates fittings 200 from FIG. 2A and further includes a body 222 (e.g., hose, hose portion), which is noted in FIG. 2A as not being shown but contemplated extending from the shank end 212, extending between a first fitting 200A and a second fitting 200B, which may be referred to as a pair of fittings on each end of the body 222. In at least one embodiment, the first fitting 200A is coupled at and/or at least partially forms a first end 224 and the second fitting 200B is coupled at and/or at least partially forms a second end 226. As described herein, diameters associated with portions of the fittings 200A, 200B may be different from diameters associated with portions of the body 222.

In at least one embodiment, the first fitting 200A at the first end 224 includes a first diameter 228 and the second fitting 200B at the second end 226 includes a second diameter 230. The first diameter 228 and the second diameter 230 may be equal in various embodiments. As noted herein, the first diameter 228 and/or the second diameter 230 may be approximately 6". In at least one embodiment, the first diameter 228 is greater than the second diameter 230. In at least one embodiment, the first diameter 228 is less than the second diameter 230. As shown in FIG. 2B, as discussed herein, a third diameter 232 is associated with the body 222. In this embodiment, the third diameter 232 is smaller than the first diameter 228 and the second diameter 230. For example, as noted herein, the third diameter 232 may be approximately 5" while the first diameter 228 and/or the second diameter 230 is approximately 6". In at least one embodiment, the third diameter 232 may be equal to and/or greater than the first diameter 228. In at least one embodiment, the third diameter 232 may be equal to and/or greater than the second diameter 230.

Figure 3:
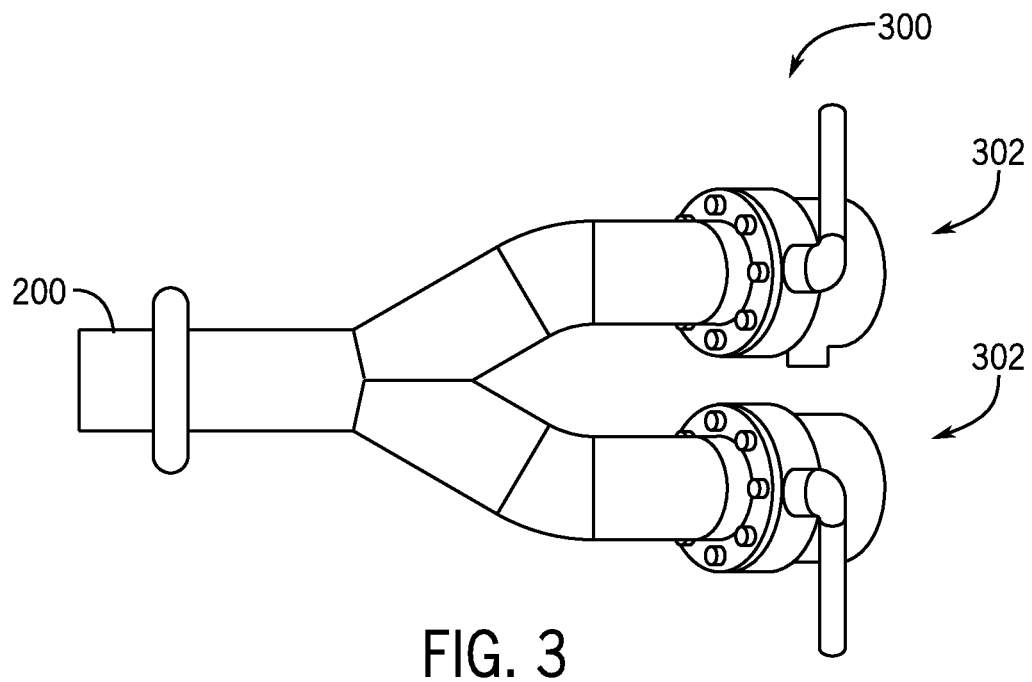
FIG. 3 is a schematic perspective view of an embodiment of a flow line, in accordance with embodiments of the present disclosure.

FIG. 3 is a schematic perspective view of an embodiment of a portion of a flow line 300 including the fitting 200. In the illustrated embodiment, the flow line 300 includes connections 302 for coupling to mating 6" connections. However, due to the inclusion of the fitting 200, a 5" flow line may be incorporated into the design. The fitting 200, as noted above includes a transition from the 5" line to a 6" connection, thereby enabling use with the illustrated flow line 300. Advantageously, the flow line 300 may continue to be used in wellbore operations without modifications, which may reduce costs to operators with respect to obtaining new equipment for jobs.

As noted above, embodiments of the present disclosure provide advantages over existing systems that either utilize flow lines having diameters that are too small to provide sufficient capacity or are too large to maintain fluid velocities above threshold levels. Embodiments of the present disclosure overcome these problems by providing more volume, reducing drop in pressure, and reducing a likelihood of cavitation and other unhealthy pump conditions, such as starving. By way of example, frac slurry often consists of sand media also known as proppant, at low fluid velocities this proppant can begin to fall out of suspension. Some industry data notes that sand fall out begins at 2.21 ft/sec, which equates to 3.2 BPM in a 5" hose. Sand fall out is substantial at 1.72 ft/sec, which equates to 2.2 BPM in a 5" hoses. As a result, systems may be deployed to ensure that flow rates are maintained above these levels (which may be set as the thresholds) during operation.

Furthermore, embodiments of the present disclosure improve existing systems by reducing damage accumulation rates due to the improved flow characteristics associated with the 5" hose when compared to the 4" hose of existing systems. For example, a damage accumulate rate associated with the 5" hose may be less than the 4" hose and may increase at a lower rate as flow rate increases. Damage accumulation may be a factor, at least in part, on flow velocities, where a small diameter pipe will have greater velocities than a larger diameter pipe.

Figure 4:
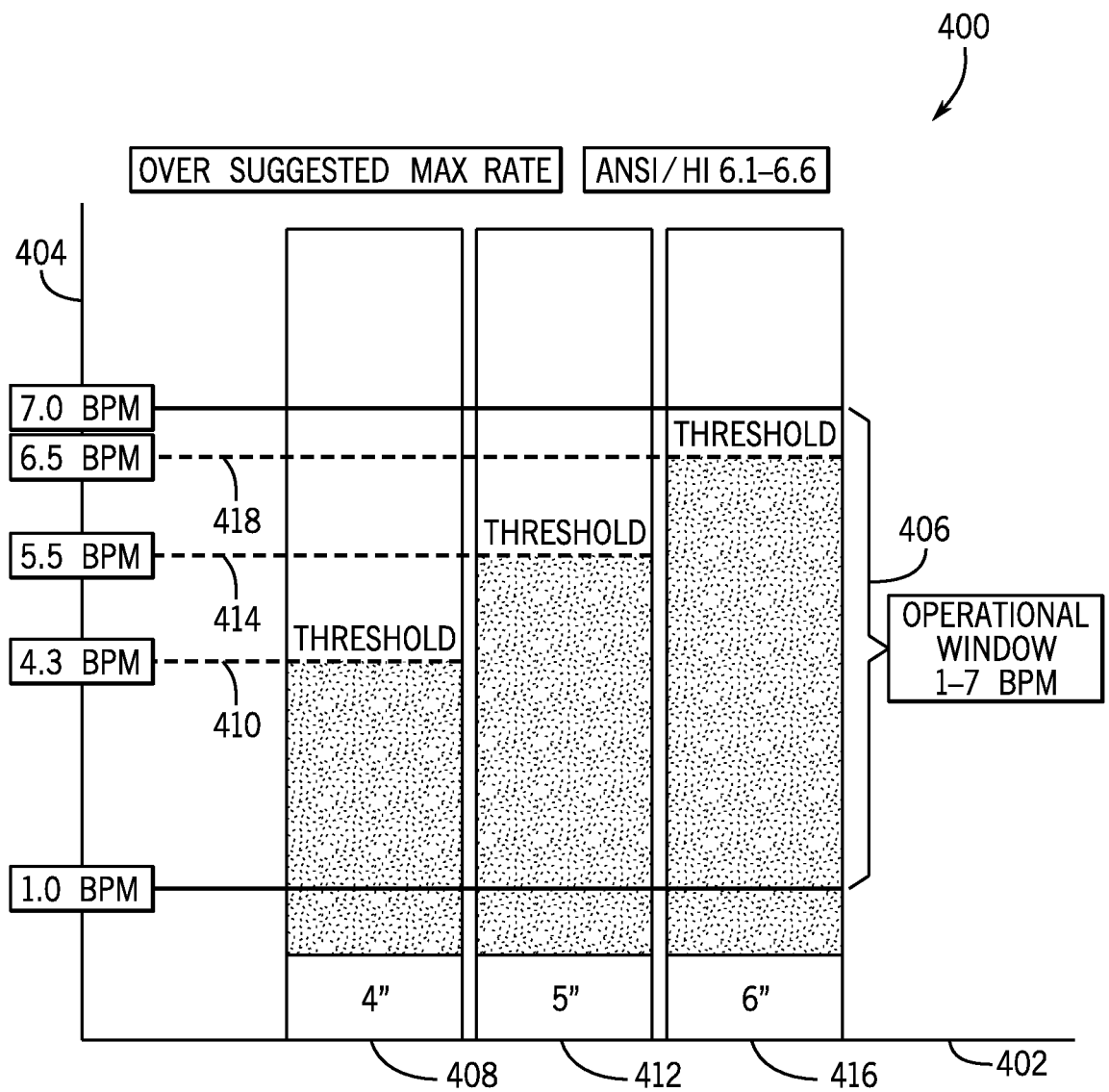
FIG. 4 is a graphical representation of suction pipe flow rates, in accordance with embodiments of the present disclosure.

FIG. 4 is a graphical representation 400 illustrating pump flow rates and respective suction piping sizes. The x-axis 402 corresponds to suction pipe diameter (in inches) and the y-axis 404 corresponds to flow rate (in BPM). An operational window 406 is provided indicative of typical ranges where fracturing operations may occur. In this embodiment, the operational widow 406 extends from approximately 1 BPM to approximately 7 BPM.

Each respective suction pipe diameter includes a threshold flow rate, which may be obtained through experimental procedures and/or reference materials. For example, a 4" suction pipe illustrated at 408 has a threshold 410 of approximately 4.3 BPM, a 5" suction pipe illustrated at 412 has a threshold 414 of approximately 5.5 BPM, and a 6" suction pipe illustrated at 416 has a threshold 418 of approximately 6.5 BPM. The operational window 406 includes a portion that exceeds each of the illustrated thresholds 410, 414, 418.

Operations using the 4" suction pipe 408 include an operating range that is approximately 40% larger than the threshold 410. As a result, there is a high likelihood that operations will exceed the threshold due to demands to supply additional fluid for fracturing operations. Similarly, operations using the 5" suction pipe 412 and the 6" suction pipe 416 also exceed threshold 414, 418 by approximately 22% and 7%, respectively. The instant application has identified that while the 6" suction pipe 416 enables the largest flow rate, that problems associated with fluid velocities and drop out make the 6" suction pipe 416 undesirable. Accordingly, embodiments may incorporate the 5" suction pipe 412, which provides significant improvements over the 4" suction pipe 408 while also reducing the likelihood of drop out. The 5" suction pipe 412 also has less pressure drop, when compared to the 4" suction pipe 408, providing an additional improvement over existing configurations.

The present disclosure described herein, therefore, is well adapted to carry out the objects and attain the ends and advantages mentioned, as well as others inherent therein. While a presently preferred embodiment of the disclosure has been given for purposes of disclosure, numerous changes exist in the details of procedures for accomplishing the desired results. These and other similar modifications will readily suggest themselves to those skilled in the art, and are intended to be encompassed within the spirit of the present disclosure disclosed herein and the scope of the appended claims.

The invention claimed is:

1. A coupling system, comprising:
a first end comprising a first fitting with an inlet first fitting end and an outlet first fitting end, the outlet first fitting end having a first diameter, the outlet first fitting end being coupled to a fluid source associated with a hydraulic fracturing operation, wherein the fluid source is configured to provide a slurry to an electric-powered hydraulic fracturing pump;
a second end comprising a second fitting with an inlet second fitting end and an outlet second fitting end having a second diameter, the first diameter being different from the second diameter, the outlet second fitting end being coupled to an inlet of the electric-powered hydraulic fracturing pump; and
a body having a third diameter, the third diameter being less than the first diameter and less than the second diameter, wherein the body extends between the first end and the second end to couple to the inlet first fitting end and to the inlet second fitting end.

2. The coupling system of claim 1, wherein the second diameter is approximately 6 inches and the third diameter is approximately 5 inches.

3. The coupling system of claim 1, further comprising:
a fourth end comprising a fourth fitting with an inlet fourth fitting end and an outlet fourth fitting end having a fourth diameter, the first diameter being different from the fourth diameter and the fourth diameter being equal to the second diameter.

4. The coupling system of claim 3, further comprising:
a flow splitter coupled to the body, the flow splitter directing a first portion of flow through the body to the second end and a second portion of flow through the body to the fourth end.

5. The coupling system of claim 1, wherein the first fitting end further comprises:
a reducer positioned between the inlet first fitting end and the outlet first fitting end, the reducer being welded to the respective inlet first fitting end and the outlet first fitting end at each end, the reducer having an increasing diameter along its axial length.

6. The coupling system of claim 5, wherein at least a portion of the reducer extends into a groove formed in the inlet first fitting end, the inlet first fitting end extending farther laterally than the reducer.

7. A coupling system, comprising:
a hose extending between a first end and a second end, the first end being coupled to a fluid source and the second end being coupled to an electric-powered hydraulic fracturing pump;
a first fitting at the first end, comprising:
a first fitting union having a first coupling end and a first mating end, the first coupling end having a first coupling end diameter that is greater than a first mating end diameter;
a first reducer having a first reducer diameter at a first reducer end and a second reducer diameter at a second reducer end, the first reducer end being coupled to the first mating end; and
a first shank having a first shank end and a second shank end, the first shank end coupled to the second reducer end and the second shank end receiving at least a portion of the first end of the hose;
a second fitting at the second end, comprising:
a second fitting union having a second coupling end and a second mating end, the second coupling end having a second coupling end diameter that is greater than a second mating end diameter;
a second reducer having a third reducer diameter at a third reducer end and a fourth reducer diameter at a fourth reducer end, the third reducer end being coupled to the second mating end; and a second shank having a third shank end and a fourth shank end, the third shank end coupled to the fourth reducer end and the third shank end receiving at least a portion of the second end of the hose.

8. The coupling system of claim 7, wherein the first coupling end diameter is approximately 6 inches and the second reducer diameter is approximately 5 inches.

9. The coupling system of claim 7, further comprising:
a third end, comprising:
    a third fitting union having a third coupling end and a third mating end, the third coupling end having a third coupling end diameter that is greater than a third mating end diameter;
    a third reducer having a fifth reducer diameter at a fifth reducer end and a sixth reducer diameter at a sixth reducer end; and
    a third shank having a fifth shank end and a sixth shank end, the fifth shank end coupled to the fifth reducer end and the sixth shank end receiving at least a portion of the hose.

10. The coupling system of claim 9, wherein the second fitting end and the third fitting end are coupled together by a flow splitter.

11. The coupling system of claim 7, wherein at least a portion of the first reducer extends into a groove formed in the first mating end, the first mating end extending farther laterally than the first reducer.

12. The coupling system of claim 7, wherein the coupling system forms a portion of a flow path at a hydraulic fracturing location to direct a flow to the electric-powered hydraulic fracturing pump, further comprising:
    at least one electric motor operatively coupled to the electric-powered hydraulic fracturing pump; and
    a distribution system fluidly coupled to an outlet of the electric-powered hydraulic fracturing pump to direct a slurry into a wellbore.

13. A method for forming a flow connection in a hydraulic fracturing system, comprising:
    determining a first end connection size for an electric-powered hydraulic fracturing pump;
    determining a second end connection size for a fluid source associated with the electric-powered hydraulic fracturing pump;
    determining, based at least on the first end connection size and the second end connection size, a flow rate that exceeds a threshold, wherein the threshold corresponds to a drop out rate for particles in a slurry flowing through a hose;
    determining, based at least on the flow rate, a hose diameter; and
    forming the flow connection by coupling the hose having the hose diameter to a first fitting having the first end connection size and a second fitting having the second end connection size.

14. The method of claim 13, further comprising:
    determining a second flow rate, based at least on the first end connection size, the second end connection size, and a second hose diameter, is below the threshold.

15. The method of claim 13, wherein the hose diameter is approximately 5 inches.

16. The method of claim 15, wherein the first end connection size is approximately 6 inches.

17. The method of claim 13, further comprising:
    determining a volumetric demand associated with the hose exceeds a second threshold when the hose has the hose diameter.

18. The method of claim 13, further comprising:
    determining a volumetric demand associated with the hose is below a second threshold when the hose has the hose diameter; and
    determining a second hose diameter; and
    determining the volumetric demand associated with the hose exceeds the second threshold when the hose has the second hose diameter.

19. The method of claim 13, wherein the first end connection size is different from the second end connection size and the hose diameter.

* * * * *